(12) United States Patent
Gokhale

(10) Patent No.: US 8,219,524 B2
(45) Date of Patent: Jul. 10, 2012

(54) APPLICATION-AWARE AND REMOTE SINGLE INSTANCE DATA MANAGEMENT

(75) Inventor: Parag Gokhale, Ocean, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 446 days.

(21) Appl. No.: 12/145,342

(22) Filed: Jun. 24, 2008

(65) Prior Publication Data
US 2009/0319585 A1      Dec. 24, 2009

(51) Int. Cl.
*G06F 7/00* (2006.01)
(52) U.S. Cl. ......................................... 707/610
(58) Field of Classification Search .................. 707/610, 707/755, 661, 999.204
See application file for complete search history.

(56) References Cited

U.S. PATENT DOCUMENTS

| | | |
|---|---|---|
| 4,686,620 A | 8/1987 | Ng |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi et al. |
| 5,491,810 A | 2/1996 | Allen |
| 5,495,607 A | 2/1996 | Pisello et al. |
| 5,504,873 A | 4/1996 | Martin et al. |

(Continued)

FOREIGN PATENT DOCUMENTS

EP       0259912       3/1988

(Continued)

OTHER PUBLICATIONS

U.S. Appl. No. 12/626,839, filed Nov. 27, 2009, Klose, Michael F.

(Continued)

*Primary Examiner* — Kimberly Wilson
*Assistant Examiner* — Mohammed R Uddin
(74) *Attorney, Agent, or Firm* — Perkins Coie LLP

(57) ABSTRACT

A method and system for reducing storage requirements and speeding up storage operations by reducing the storage of redundant data includes receiving a request that identifies one or more files or data objects to which to apply a storage operation. For each file or data object, the storage system determines if the file or data object contains data that matches another file or data object to which the storage operation was previously applied, based on awareness of the application that created the data object. If the data objects do not match, then the storage system performs the storage operation in a usual manner. However, if the data objects do match, then the storage system may avoid performing the storage operation with respect to the particular file or data object.

23 Claims, 12 Drawing Sheets

U.S. PATENT DOCUMENTS

| | | | |
|---|---|---|---|
| 5,544,345 A | 8/1996 | Carpenter et al. | |
| 5,544,347 A | 8/1996 | Yanai et al. | |
| 5,559,957 A | 9/1996 | Balk | |
| 5,619,644 A | 4/1997 | Crockett et al. | |
| 5,638,509 A | 6/1997 | Dunphy et al. | |
| 5,673,381 A | 9/1997 | Huai et al. | |
| 5,699,361 A | 12/1997 | Ding et al. | |
| 5,729,743 A | 3/1998 | Squibb | |
| 5,751,997 A | 5/1998 | Kullick et al. | |
| 5,758,359 A | 5/1998 | Saxon | |
| 5,761,677 A | 6/1998 | Senator et al. | |
| 5,764,972 A | 6/1998 | Crouse et al. | |
| 5,778,395 A | 7/1998 | Whiting et al. | |
| 5,812,398 A | 9/1998 | Nielsen | |
| 5,813,008 A | 9/1998 | Benson et al. | |
| 5,813,009 A | 9/1998 | Johnson et al. | |
| 5,813,017 A | 9/1998 | Morris | |
| 5,875,478 A | 2/1999 | Blumenau | |
| 5,887,134 A | 3/1999 | Ebrahim | |
| 5,901,327 A | 5/1999 | Ofek | |
| 5,924,102 A | 7/1999 | Perks | |
| 5,940,833 A | 8/1999 | Benson | |
| 5,950,205 A | 9/1999 | Aviani, Jr. | |
| 5,974,563 A | 10/1999 | Beeler, Jr. | |
| 5,990,810 A | 11/1999 | Williams | |
| 6,021,415 A | 2/2000 | Cannon et al. | |
| 6,026,414 A | 2/2000 | Anglin | |
| 6,052,735 A | 4/2000 | Ulrich et al. | |
| 6,076,148 A | 6/2000 | Kedem et al. | |
| 6,094,416 A | 7/2000 | Ying | |
| 6,131,095 A | 10/2000 | Low et al. | |
| 6,131,190 A | 10/2000 | Sidwell | |
| 6,148,412 A | 11/2000 | Cannon et al. | |
| 6,154,787 A | 11/2000 | Urevig et al. | |
| 6,161,111 A | 12/2000 | Mutalik et al. | |
| 6,167,402 A | 12/2000 | Yeager | |
| 6,212,512 B1 | 4/2001 | Barney et al. | |
| 6,260,069 B1 | 7/2001 | Anglin | |
| 6,269,431 B1 | 7/2001 | Dunham | |
| 6,275,953 B1 | 8/2001 | Vahalia et al. | |
| 6,301,592 B1 | 10/2001 | Aoyama et al. | |
| 6,324,581 B1 | 11/2001 | Xu et al. | |
| 6,328,766 B1 | 12/2001 | Long | |
| 6,330,570 B1 | 12/2001 | Crighton et al. | |
| 6,330,642 B1 | 12/2001 | Carteau | |
| 6,343,324 B1 | 1/2002 | Hubis et al. | |
| RE37,601 E | 3/2002 | Eastridge et al. | |
| 6,356,801 B1 | 3/2002 | Goodman et al. | |
| 6,389,432 B1 | 5/2002 | Pothapragada et al. | |
| 6,421,711 B1 | 7/2002 | Blumenau et al. | |
| 6,487,561 B1 | 11/2002 | Ofek et al. | |
| 6,513,051 B1* | 1/2003 | Bolosky et al. | 1/1 |
| 6,519,679 B2 | 2/2003 | Devireddy et al. | |
| 6,538,669 B1 | 3/2003 | Lagueux, Jr. et al. | |
| 6,564,228 B1 | 5/2003 | O'Connor | |
| 6,658,526 B2 | 12/2003 | Nguyen et al. | |
| 6,704,730 B2 | 3/2004 | Moulton et al. | |
| 6,757,794 B2 | 6/2004 | Cabrera et al. | |
| 6,810,398 B2 | 10/2004 | Moulton | |
| 6,952,758 B2 | 10/2005 | Chron et al. | |
| 7,017,113 B2 | 3/2006 | Bourbakis et al. | |
| 7,035,943 B2 | 4/2006 | Yamane et al. | |
| 7,117,246 B2 | 10/2006 | Christenson et al. | |
| 7,143,091 B2 | 11/2006 | Charnock et al. | |
| 7,191,290 B1 | 3/2007 | Ackaouy et al. | |
| 7,246,272 B2 | 7/2007 | Cabezas et al. | |
| 7,272,606 B2 | 9/2007 | Borthakur et al. | |
| 7,287,252 B2 | 10/2007 | Bussiere et al. | |
| 7,320,059 B1 | 1/2008 | Armangau et al. | |
| 7,395,282 B1 | 7/2008 | Crescenti et al. | |
| 7,444,387 B2 | 10/2008 | Douceur et al. | |
| 7,478,113 B1 | 1/2009 | De Spiegeleer et al. | |
| 7,487,245 B2 | 2/2009 | Douceur et al. | |
| 7,496,604 B2 | 2/2009 | Sutton, Jr. et al. | |
| 7,685,177 B1 | 3/2010 | Hagerstrom et al. | |
| 7,685,459 B1 | 3/2010 | De Spiegeleer et al. | |
| 2002/0099806 A1 | 7/2002 | Balsamo et al. | |
| 2002/0107877 A1 | 8/2002 | Whiting et al. | |
| 2003/0033308 A1 | 2/2003 | Patel et al. | |
| 2003/0110190 A1 | 6/2003 | Achiwa et al. | |
| 2004/0148306 A1 | 7/2004 | Moulton et al. | |
| 2004/0250033 A1 | 12/2004 | Prahlad et al. | |
| 2005/0033756 A1 | 2/2005 | Kottomtharayil et al. | |
| 2005/0086443 A1 | 4/2005 | Mizuno et al. | |
| 2005/0114406 A1 | 5/2005 | Borthakur et al. | |
| 2005/0131900 A1 | 6/2005 | Palliyll et al. | |
| 2005/0138312 A1* | 6/2005 | Kubo et al. | 711/162 |
| 2005/0203864 A1 | 9/2005 | Schmidt et al. | |
| 2006/0005048 A1 | 1/2006 | Osaki et al. | |
| 2006/0010227 A1 | 1/2006 | Atluri | |
| 2006/0053305 A1 | 3/2006 | Wahlert et al. | |
| 2006/0095527 A1* | 5/2006 | Malik | 709/206 |
| 2006/0224846 A1 | 10/2006 | Amarendran et al. | |
| 2006/0230244 A1 | 10/2006 | Amarendran et al. | |
| 2006/0242489 A1 | 10/2006 | Brockway et al. | |
| 2007/0022145 A1* | 1/2007 | Kavuri | 707/204 |
| 2007/0118705 A1* | 5/2007 | Arakawa et al. | 711/162 |
| 2007/0130216 A1* | 6/2007 | Wolfgang et al. | 707/201 |
| 2007/0179995 A1 | 8/2007 | Prahlad et al. | |
| 2007/0198613 A1 | 8/2007 | Prahlad et al. | |
| 2007/0203937 A1 | 8/2007 | Prahlad et al. | |
| 2007/0226438 A1* | 9/2007 | Erofeev | 711/162 |
| 2007/0255758 A1 | 11/2007 | Zheng et al. | |
| 2008/0028007 A1 | 1/2008 | Ishii et al. | |
| 2008/0098083 A1* | 4/2008 | Shergill et al. | 709/217 |
| 2008/0162320 A1 | 7/2008 | Mueller et al. | |
| 2008/0162518 A1* | 7/2008 | Bollinger et al. | 707/101 |
| 2008/0189610 A1* | 8/2008 | Wang et al. | 715/277 |
| 2009/0112870 A1* | 4/2009 | Ozzie et al. | 707/9 |
| 2009/0132619 A1* | 5/2009 | Arakawa et al. | 707/205 |
| 2009/0144285 A1 | 6/2009 | Chatley et al. | |
| 2009/0177719 A1* | 7/2009 | Kavuri | 707/204 |
| 2009/0204649 A1 | 8/2009 | Wong et al. | |
| 2010/0082672 A1* | 4/2010 | Kottomtharayil et al. | 707/770 |
| 2010/0094817 A1 | 4/2010 | Ben-Shaul et al. | |
| 2010/0161554 A1* | 6/2010 | Datuashvili et al. | 707/610 |

FOREIGN PATENT DOCUMENTS

| | | |
|---|---|---|
| EP | 0405926 | 1/1991 |
| EP | 0467546 | 1/1992 |
| EP | 0774715 | 5/1997 |
| EP | 0809184 | 11/1997 |
| EP | 0899662 | 3/1999 |
| EP | 0981090 | 2/2000 |
| WO | WO-95/13580 | 5/1995 |
| WO | WO-99/12098 | 3/1999 |

OTHER PUBLICATIONS

Diligent Technologies "HyperFactor," <http://www.diligent.com/products:protecTIER-1:HyperFactor-1>, Internet accessed on Dec. 5, 2008, 2 pages.

Overland Storage, "Data Deduplication," <http://www.overlandstorage.com/topics/data_deduplication.html>, Internet accessed on Dec. 5, 2008, 2 pages.

Lortu Software Development, "Kondar Technology-Deduplication," <http://www.lortu.com/en/deduplication.asp>, Internet accessed on Dec. 5, 2008, 3 pages.

Quantum Corporation, "Data De-Duplication Background: A Technical White Paper," May 2008, 13 pages.

Kornblum, Jesse, "Identifying Almost Identical Files Using Context Triggered Piecewise Hashing," www.sciencedirect.com, Digital Investigation 3S (2006), pp. S91-S97.

International Search Report and Written Opinion, International Application No. PCT/US2009/58137, Mail Date Dec. 23, 2009, 14 pages.

U.S. Appl. No. 11/950,376, filed Dec. 4, 2007, Bunte et al.
U.S. Appl. No. 11/963,623, filed Dec. 21, 2007, Gokhale et al.
U.S. Appl. No. 12/058,178, filed Mar. 28, 2008, Prahlad et al.
U.S. Appl. No. 12/058,317, filed Mar. 28, 2008, Prahlad et al.
U.S. Appl. No. 12/058,367, filed Mar. 28, 2008, Prahlad et al.
U.S. Appl. No. 12/145,347, filed Jun. 24, 2008, Gokhale.
U.S. Appl. No. 12/167,933, filed Jul. 3, 2008.

Armstead et al., "Implementation of a Campus-wide Distributed Mass Storage Service: The Dream vs. Reality," *IEEE*, 1995, pp. 190-199.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Jason Gait, "The Optical File Cabinet: A Random-Access File System For Write-Once Optical Disks," *IEEE Computer*, vol. 21, No. 6, pp. 11-22 (1988) (see in particular figure 5 in p. 15 and recitation in claim 5).

Rosenblum et al., "The Design and Implementation of a Log-Structured File System," *Operating Systems Review SIGOPS*, vol. 25, No. 5, New York, US, pp. 1-15 (May 1991).

U.S. Appl. No. 12/647,906, filed Dec. 28, 2009, Attarde et al.

U.S. Appl. No. 12/649,454, filed Dec. 30, 2009, Muller et al.

Commvault Systems, Inc., "Continuous Data Replicator 7.0," Product Data Sheet, 2007.

U.S. Appl. No. 12/565,576, filed Sep. 23, 2009, Kottomtharayil et al.

CommVault Systems, Inc., "Deduplication," <http://documentation.commvault.com/commvault/release_8_0_0/books_online_1/english_US/features/single_instance/single_instance.htm>, earliest known publication date: Jan. 26, 2009, 9 pages.

CommVault Systems, Inc., "Deduplication—How To," <http://documentation.commvault.com/commvault/release_8_0_0/books_online_1/english_US/features/single_instance/single_instance_how_to.htm>, earliest known publication date: Jan. 26, 2009, 7 pages.

U.S. Appl. No. 13/251,022, filed Sep. 30, 2011, Gokhale.

\* cited by examiner

APPLICATION-AWARE AND REMOTE SINGLE INSTANCE DATA MANAGEMENT

BACKGROUND

Computer systems contain large amounts of information. This information includes personal information, such as financial information, customer/client/patient contact information, audio/visual information, and much more. This information also includes information related to the correct operation of the computer system, such as operating system files, application files, user settings, and so on. With the increased reliance on computer systems to store critical information, the importance of protecting information has grown. Traditional storage systems receive an identification of a file to protect, then create one or more secondary copies, such as backup files, containing the contents of the file. These secondary copies can then later be used to restore the original data should anything happen to the original data.

In corporate environments, protecting information is generally part of a routine process that is performed for many computer systems within an organization. For example, a company might back up critical computing systems related to e-commerce such as databases, file servers, web servers, and so on as part of a daily, weekly, or monthly maintenance schedule. The company may also protect computing systems used by each of its employees, such as those used by an accounting department, marketing department, engineering department, and so forth.

Although each computer system contains certain unique information, many systems may contain very similar information. For example, although a computing system used by a marketing employee and a computing system used by an engineering employee will generally contain unique information created by each employee in the course of their work, both computing systems will likely have the same operating system installed, with thousands of identical or similar files used by the operating system. Similarly, both computing systems will likely have at least some similar application programs installed, such as a word processor, spreadsheet, Internet browser, and so on. Both systems may also have similar corporate information. For example, each employee may have an electronic copy of an employee manual distributed by the company. Information other than files may also be identical or similar between systems. For example, user settings and preferences may have similar default values on each system and application programs may contain similar templates on each system that are stored as application-specific information. As another example, several employees may have received a copy of the same email, and the email may be stored in each employee's electronic mailbox.

As a result of the amount of redundant information in an organization, secondary copies of an organization's information are often very large and can require the purchase of expensive storage devices and storage media. The restoration of data in the event of data loss is also slowed by the large size of the secondary copies. As the size of secondary copies increases, locating and restoring information requires more actions to be taken. For example, it may be necessary to search many tapes or other media to find the correct secondary copy. The great quantity of storage media, such as tapes, may mean that some secondary storage media has been moved offsite requiring that it first be retrieved before information can be recovered from it. Each of these factors increases the cost of protecting information and the time required to recover information in the event of data loss.

Quick recovery of information is often critical to today's businesses, and any additional delay can affect business operations and customers' satisfaction with the business.

Single instancing in a data management system is the process of attempting to store only a single instance of each file. Some prior systems permit data de-duplication, or single instancing, at a file level or at a block level, but such systems are unable to determine similar blocks of data within a given application. Data objects are often stored in large, monolithic files that are intended to be read only by the application that created them. For example, a Microsoft Exchange email server stores email messages in one or more large data files that typically hold thousands of different users' mailboxes. As another example, a database server often stores tables, forms, reports, and other data objects in one or two large data files that provide persistence for the entire database. Thus, typical data management systems are only able to perform data management operations on the large data file, rather than the data objects themselves. In the case of the email server, a given electronic mail application may generate multiple email messages that all differ, but which all contain the same attachment. Prior systems may not be able to differentiate these messages, and thus each would be stored with the attachment. Further, if two files had different properties or metadata, such prior systems would store both files, even though the data they contain are identical and differ only by their metadata.

Another problem with prior single instancing systems is that they may work fine within a given local environment, but if remote clients or devices provide data to a central single instancing system, each of the various remote clients sends data to the central single instancing system, even if much of that data is duplicative and ultimately ignored by the single instancing system. Thus, bandwidth and resources are wasted.

There is a need for a system that overcomes the above problems, as well as one that provides additional benefits.

Figure 1:
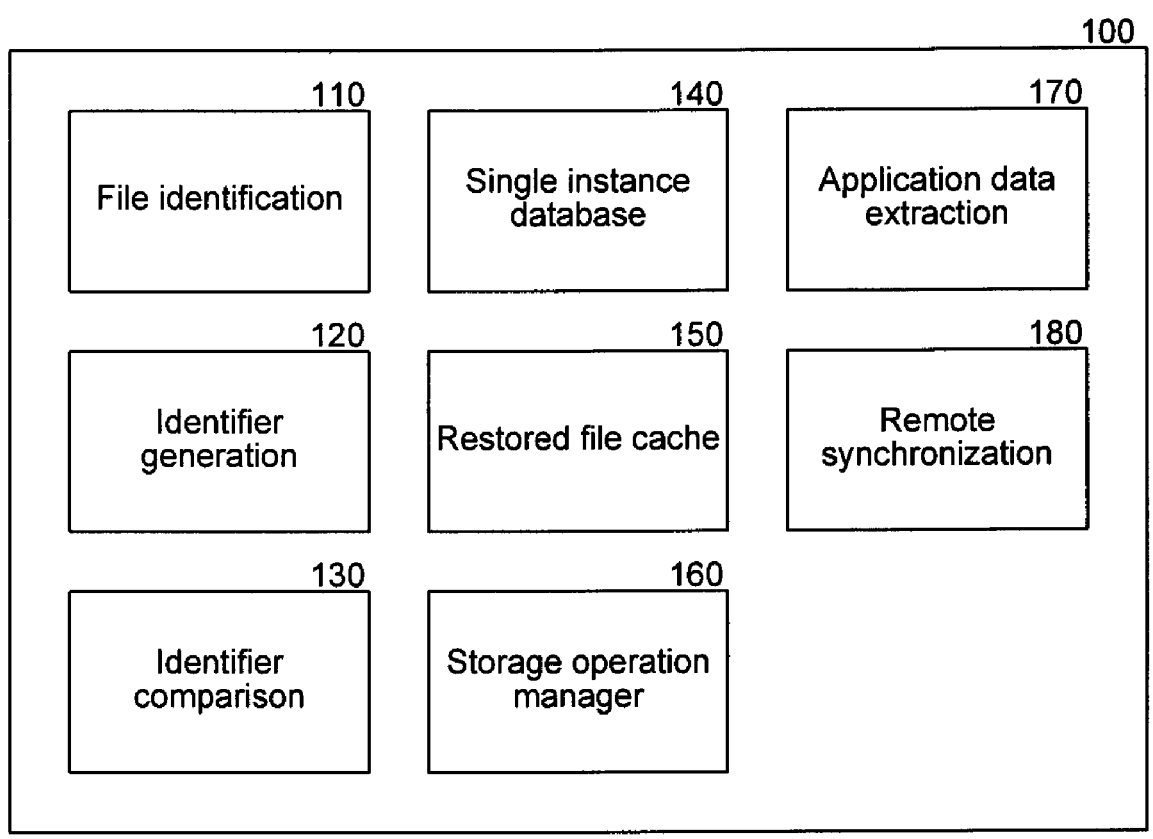
FIG. 1 is a block diagram that illustrates components of a single instancing system in accordance with one embodiment of the invention.

In the drawings, the same reference numbers and acronyms identify elements or acts with the same or similar functionality for ease of understanding and convenience. To easily identify the discussion of any particular element or act, the most significant digit or digits in a reference number refer to the Figure number in which that element is first introduced (e.g., element 604 is first introduced and discussed with respect to FIG. 6).

DETAILED DESCRIPTION

The headings provided herein are for convenience only and do not necessarily affect the scope or meaning of the claimed invention.

Overview

Described in detail herein is a single instancing system that more intelligently identifies multiple copies of the same data object. For example, the single instancing system recognizes documents, files, or data objects produced by multiple different applications, and can parse through and identify those data objects common among data blocks within a file, and thereby only copy a single instance of those common data objects. The single instancing system parses the proprietary data formats of many applications, and can identify data objects related to the application, even when those data objects are stored in large, monolithic data files. In addition, if two documents, files, or data objects are substantially similar, but have differing metadata, such as different user permissions, the single instancing system can store a single instance of the data object, but retain all differing versions of the metadata (for example, such as by retaining the different user permissions). When a client requests the data object, the single instancing system returns appropriate metadata based on the identity of the client or other information.

Under another aspect of the single instancing system, if multiple clients and associated media agents are in remote locations, the single instancing system may perform backup of data to a local, single instance database or data store at each remote location. Then, the single instancing system may use continuous data replication (CDR) to copy the data contained in each local data store to a central location. At least three variations are possible. First, a single instance database can be at a remote location, and the single instancing system only transfers de-duplicated data to the central location. Second, the single instance database may be located at a central location, and the remote locations may send queries to determine what new or unique data is to be transferred from the remote locations. Third, each client computer at a remote location may query a central single instance database directly, and only transfer unique data to the local store or central location.

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

Unless described otherwise below, aspects of the invention may be practiced with conventional data processing systems. Thus, the construction and operation of the various blocks shown in FIG. 1 may be of conventional design, and need not be described in further detail herein to make and use the invention, because such blocks will be understood by those skilled in the relevant art. One skilled in the relevant art can readily make any modifications necessary to the blocks in FIG. 1 (or other embodiments or figures) based on the detailed description provided herein.

FIG. 1 is a block diagram that illustrates components of a single instancing system 100, in one embodiment. The single instancing system 100 contains a file identification component 110, an identifier generation component 120, an identifier comparison component 130, a single instance database component 140, a restored file cache component 150, a storage operation manager component 160, an application data extraction component 170, and a remote synchronization component 180. The file identification component 110 identifies files or data objects, such as in response to a storage operation. As used herein, a file or a data object refers to any collection or grouping of bytes of data that can be viewed as one or more logical units. For example, a file could be a computer file on a file system (for example, a word processing file, a spreadsheet file, a database file, etc.) As another example, a data object could be within a file (for example, an embedded object within a word processing file, a cell or a row in a spreadsheet file, a table or an entry in a table in a database file, etc.). The file identification component 110 may retrieve additional information related to a file or data object, such as its size, that is used by the single instancing system 100 to uniquely identify the data object. When the file identification component 110 identifies a file, the application data extraction component 170 determines whether the file contains additional data objects. For example, the file may be an application-specific container (for example, a database file), that stores data objects such as documents, email messages, and other collections of data. The application data extraction component 170 would determine that each of the data objects within the application-specific container should be identified. The identifier generation component 120 generates a substantially unique identifier of a file or data object that is used to determine if another file or data object already stored by the single instancing system matches the file or data object used to generate the substantially unique identifier. The identifier comparison component 130 performs comparisons of identifiers of various files or data objects to determine if the files or data objects contain similar data (for example, the identifier comparison component 130 can compare substantially unique identifiers of two or more files or data objects to determine if the files or data objects contain similar data).

The single instance database component 140 is a data store that contains entries identifying files or data objects managed by the single instancing system 100, and may also contain supplemental information associated with files or data objects, such as a substantially unique identifier, a path, a location, a reference count, a file size or other information. The restored file cache component 150 provides an intermediate location that may be used by the single instancing system 100 during a restore operation to hold instances of files or data objects for which additional references may need to be restored. For example, during a restore operation, the single instancing system may restore files or data objects to the cache and then transfer the files or data objects to a target location of the restore operation. When the single instancing system 100 encounters a reference to a single instance copy of a file or data object, the single instancing system 100 may consult the restored file cache component 150 or an index. The single instancing system 100 does so to determine if the file or data object is present in the cache before attempting to restore the file or data object from another location, such as from secondary storage (for example, a tape). The storage operation manager component 160 coordinates storage operations and invokes the other components of the single instancing system 100 as needed to perform requested storage operations. For example, the storage operation manager component 160 may include an application used by an administrator to manage the single instancing system 100. The storage operation manager component 160 may also maintain indexes of the data objects and each of the references to those data objects through the single instancing system 100, as well as pending operations on the data objects that are part of a data management plan of an organization implementing the single instancing system 100.

The remote synchronization component 180 performs single instancing between a remote location and a central location, such as between an enterprise or organization having a headquarters or central office and one or more satellite offices or remote offices, or vice-versa. The remote synchronization component 180 uses the techniques described in further detail herein to determine whether a file or data object should be copied from the remote location to the central location.

FIG. 1 and the discussion herein provides a brief, general description of a suitable computing environment in which the invention can be implemented. Although not required, aspects of the invention are described in the general context of computer-executable instructions, such as routines executed by a general-purpose computer, e.g., a server computer, wireless device or personal computer. Those skilled in the relevant art will appreciate that the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "host," and "host computer" are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media.

Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the invention may reside on a server computer, while corresponding portions reside on a client computer such as a mobile or portable device, and thus, while certain hardware platforms are described herein, aspects of the invention are equally applicable to nodes on a network.

Single Instancing

Reducing or eliminating redundant instances of data resulting from a storage operation is sometimes referred to here as "single instancing," because what would traditionally be stored as many instances of the same data is reduced to as few as one. Redundant instances may be detected and reduced at several locations or times throughout the operation of the system that will now be described. These embodiments are provided only as examples, and are not intended to be an exhaustive list of the way in which the system can be implemented.

In some embodiments, the single instancing system performs single instancing of data at a computing system that contains or originally generated the data, such as a client computing system. For example, a client computing system that is providing data that is the target of a storage operation may receive a request from the single instancing system to provide a substantially unique identifier (for example, a hash value, message digest, checksum, digital fingerprint, digital signature or other sequence of bytes that substantially uniquely identifies the file or data object) of each file or data object included in the storage operation. The word "substantially" is used to modify the term "unique identifier" because algorithms used to produce hash values may result in collisions, where two different files or data objects result in the same hash value. However, depending upon the algorithm or cryptographic hash function used, collisions should be suitably rare and thus the identifier generated for a file or data object should be unique throughout the single instancing system. As an alternative to the single instancing system generating the substantially unique identifier, the client computing system may itself generate substantially unique identifiers for each file or data object that is stored on the client computing system on an ongoing or other basis. When a storage operation is requested, the single instancing system determines if another file or data object exists with a substantially unique identifier matching that of the one provided by the client computing system. If the single instancing system is already aware of a similar file or data object, then the client computing system does not need to send the redundant file or data object to a secondary storage location or destination.

Rather than operating only at the file level, in some embodiments, the single instancing system may also operate at a lower level of granularity by enumerating data objects within files of understood types. For example, the single instancing system may read and parse data files from email servers (for example, Microsoft® Exchange email servers, Sendmail email servers, etc.), database servers (for example, Microsoft® SQL Server database servers, Oracle database servers, etc.), web servers (for example, Microsoft® IIS web servers, Apache web servers, etc.), word processing applications (for example, Microsoft® Word, Corel WordPerfect, etc.), spreadsheet applications (for example, Microsoft®

Excel, Apple Numbers, etc.), and many others and enumerate the data objects within these files. The single instancing system may then generate a substantially unique identifier for each data object within the file, rather than each file, and store this substantially unique identifier in the single instance database component 140 or other index. The single instancing system may also store information about the associations between the data objects and their containing files. Therefore, the single instancing system enables data storage operations such as searching, backing up, restoring, replicating, copying and so forth to be performed at the data object level. Enabling data storage operations at the data object level enables the single instancing system to store data using much less space than traditional single instancing storage systems, because files containing data objects are likely to have redundant data objects, of which only one instance or copy need be stored. For example, the data of two email servers that each contain similar email messages in a large data file can be stored in much less space than if the entire data files of each email server were to be stored, because the data files are likely to contain redundant email messages, of which only one instance or copy need be stored. This is because traditional single instancing systems would determine that the two data files differed and would store both data files, thereby consuming more storage space.

Figure 2:
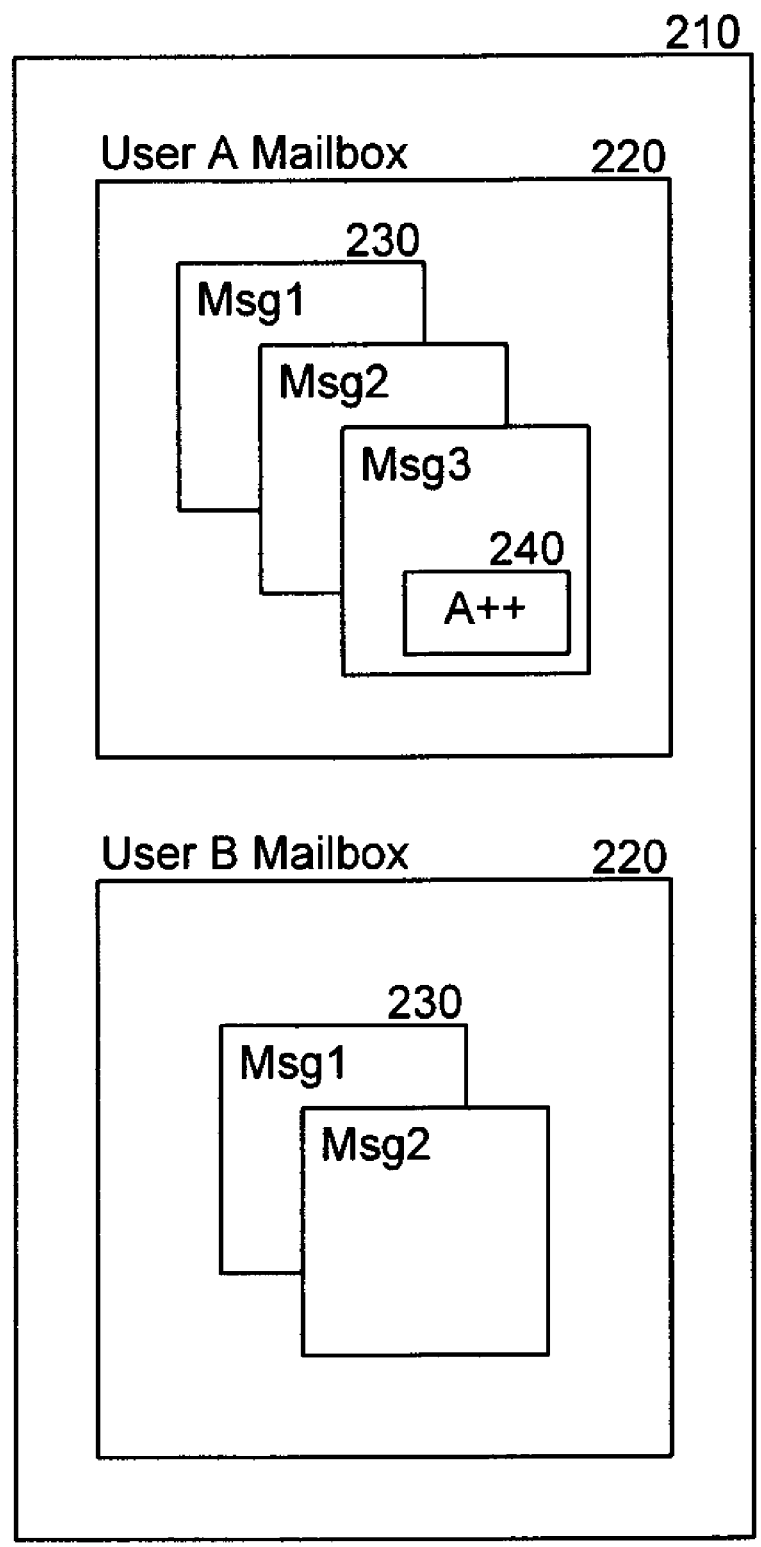
FIG. 2 is a block diagram that illustrates an example data file containing data objects.

FIG. 2 illustrates an example data file produced by an email server. The data file 210 holds containers 220 of data related to each user that has a mailbox on the email server. Each container 220 holds email messages 230 for a specific user, and each email message 230 may contain one or more attachments 240. Email messages are often forwarded to many users, and the users may be assigned to the same or different email servers. The single instancing system may know or understand the structure of the data file 210 before performing any single instancing operations. For example, the single instancing system may identify the type of the data file based on the data file's filename extension. The identified data file type may be used to identify a format or specification that describes the structure (e.g., at which bytes specific data is stored, its particular encoding, etc.) of the data file. This knowledge of the structure enables the application data extraction component 170 to parse the data file 210, identify containers 220, and extract email messages 230 or attachments 240 from each container 220. Alternatively, the data file 210 may contain metadata or other information that describes its data structure. The application data extraction component 170 can obtain this metadata or other information, which enables it to parse the data file 210, identify containers 220, and extract email messages 230 or attachments 240 from each container 220. The single instancing system can then store only a single instance or copy of the extracted email messages 230 or attachments 240 that are similar. By operating on the data at the data object level, the single instancing system provides substantial benefit by identifying the redundancy of data objects stored within the data files and providing single instancing of the individual data objects.

In some embodiments, the single instancing system or another system performs additional operations on the data after single instancing has occurred. For example, another system may encrypt backup data that is being stored offsite to prevent unauthorized parties from accessing the data. Another system may also compress the data to reduce its size. The single instancing system enables these additional operations to be performed more efficiently, because there is less data on which to perform these additional operations after redundant data has been reduced or eliminated.

Single Instanced Archive and Backup Data Using Single Storage Policy

One example of a single instancing system employs a single storage policy or data store. A storage policy is generally a virtual container with preferences that contains a set of rules for data retention of data objects associated with the storage policy. The single instancing system in this example stores single instance data in a single location, and in a way to ensure that any relevant, unique data is retained, but only a single instance of common data is copied to the data store. Notably, a single instancing agent creates, updates, or maintains a single instance database or index that represents or stores the substantially unique identifiers of each file or data object. The single instance database or index is associated with a single storage policy that is separate from one or more data stores that store the data copies. A single storage policy may represent a storage location that includes existing data, as well as new data that has been compared to the existing data and identified as being unique.

Figure 3:
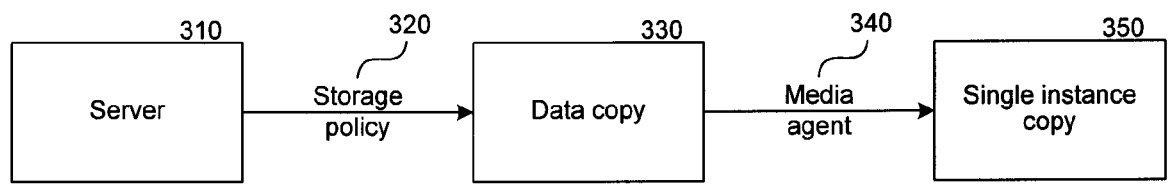
FIG. 3 is a block diagram that illustrates the flow of data during a storage operation, in one embodiment.

FIG. 3 is a block diagram that illustrates the flow of data during a storage operation, in one embodiment. Data is initially stored on a server 310 or other source of data. A storage policy 320 or other configuration information specifies a storage operation to be performed on the data. For example, the storage policy 320 may specify that the data stored on the server 310 is to be backed up daily to tape. The application of the storage policy 320 causes the backup to occur, resulting in the creation of the data copy 330. The data copy 330 may contain many redundant files or other data objects. A media agent 340 manages the data copy 330, and creates a single instance copy 350. The single instance copy 350 is a copy in which at least some of the redundant files or data objects have been removed. The media agent 340 uses the methods described herein to eliminate redundant instances of files or data objects contained in the data copy 330, and to produce the single instance copy 350. The single instance copy 350 may then be stored on tape or other media.

The single instancing system may employ one or more specialized single instancing agents. For example, as described below, the single instancing system may employ application agents associated with types of applications, metadata agents for analyzing metadata, encryption/compression agents, and so forth. Alternatively, a single agent employing all of the functions described herein may be employed. These agents operate on all types of data, including documents, files, data objects, or any data blocks.

An application agent associated with each type of application may analyze incoming or previously stored data to identify redundant data. For example, an email agent analyzes incoming or previously stored emails, including attachments to emails, to identify duplicate attachments. The email agent provides a first instance of an email with an attachment to the storage policy, but for subsequent emails having the same attachment, the email agent strips them of their attachments and stores them with a stub or pointer to the previously stored attachment.

A metadata agent analyzes files or data objects for similarities in data, but differences in metadata that is associated with the files or data objects. For example, two files may have the same data, but separate permissions, properties, access control lists (ACLs), or other metadata. The metadata agent ascertains that the two files contain the same data but have differing metadata, and thus stores only one instance of the file, but two or more instances of the associated metadata, as well as information about the associations between the metadata, the providers of the files and the files. When a client requests the file, the single instancing system provides the file to the client with the appropriate instance of the metadata based on the identity of the requester. For example, a data file may be stored on a user computer with permissions restricting access to the data file to the user of that computer, and the same data file may be stored on a second computer with permissions restricting access to the data file to an administrator of the single instancing system. The user will still be able to access the data file from the single instance store even though the user is not an administrator of the single instancing system. This is because the single instancing system will use the metadata from the file from the user's computer to ascertain that the user has the permissions needed to access the file, and permit the requested access to the user. As another example, two files may have the same data, but different properties, such as the creation date or access date. The metadata agent ascertains that the two files contain the same content but have different properties. The metadata agent thus stores only one instance of the file, but two or more instances of the properties, as well as information about the associations between the metadata, the providers of the files and the files. Because an association between the provider of the file and the file is stored, when a client requests the file, the single instancing system can provide the file with the proper metadata to the client.

The single instancing system can single instance both non-encrypted and encrypted data received from client computers. Each client computer may generate a substantially unique identifier for the file or data object before the file or data object is encrypted. The client computer does this before encryption because an encrypted file or data object would almost certainly result in a substantially unique identifier that is different from a substantially unique identifier generated from the file or data object before encryption. Alternatively, a client computer could generate a substantially unique identifier for a file or data object after the file or data object is encrypted. An encryption agent may compare the substantially unique identifiers to identify identical files or data objects, and thus only store one instance of them.

In some embodiments, the single instancing system determines whether to store an instance of an encrypted or unencrypted file (or data object, but file is used in this and the following paragraphs discussing encryption for brevity) based on whether the files are encrypted using the same encryption scheme, whether the encrypted files can be decrypted by the single instancing system, and/or other factors. For example, consider the following three situations involving encrypted files: 1) where the single instancing system has previously stored an instance of a file that is encrypted and a request is made to store another instance of the file that is also encrypted; 2) where the single instancing system has previously stored an instance of a file that is unencrypted and a request is made to store another instance of the file that is encrypted; and 3) where the single instancing system has previously stored an instance of a file that is encrypted and a request is made to store another instance of the file that is unencrypted. Metadata associated with the file is typically not encrypted. Moreover, information about the encryption scheme (for example, what public key is used to encrypt the file) may be provided as metadata to the single instancing system.

For the first situation, if the two file instances are encrypted using the same encryption scheme (for example, using the same public key), the single instancing system can avoid storing the second instance of the file. If the two files are encrypted using different encryption schemes, the single instancing system stores the second instance of the file. This is because the single instancing system has to be able to provide the second instance of the file to the requestor when requested. Alternatively, if both encryption schemes are known to the single instancing system (for example, using two different public keys of the single instancing system), the single instancing system can avoid storing the file. This is because the single instancing system can decrypt the first instance of the file and re-encrypt it using the encryption scheme used to encrypt the second instance of the file. However, this decryption and re-encryption may be too computationally expensive, depending upon various factors (for example, the time needed to decrypt and re-encrypt the file, the algorithm, etc.), and so the single instancing system may simply store the second instance of the file.

For the second situation, if the second instance of the file is encrypted using an encryption scheme that is known to the single instancing system (for example, using a public key of the single instancing system), the single instancing system can avoid storing the second instance of the file. This is because, when the provider of the second encrypted instance requests the file, the single instancing system can retrieve the first unencrypted instance, encrypt it using the known encryption scheme and provide it to the requester. However, if such encryption is too computationally expensive, the single instancing system may simply store the second encrypted instance of the file. If the second instance of the file is encrypted using an encryption scheme that is not known to the single instancing system, the single instancing system stores the second instance of the file. This is because the single instancing system has to be able to provide the second encrypted instance of the file to the requestor when requested.

For the third situation, if the first instance of the file is encrypted in such a way that it can be decrypted by the single instancing system, the single instancing system can avoid storing the second unencrypted instance of the file. This is because, when the provider of the second unencrypted instance requests the file, the single instancing system can retrieve the first encrypted instance, decrypt it, and provide it to the requestor. However, if such decryption is too computationally expensive, the single instancing system may simply store the second unencrypted instance of the file. If the first instance of the file is encrypted in such a way that it cannot be decrypted by the single instancing system, the single instancing system stores the second unencrypted instance of the file. This is because the single instancing system has to be able to provide the second unencrypted instance of the file to the requestor.

The single instancing system may also handle compressed files. Each client computer may generate a substantially unique identifier for the file or data object before the file or data object is compressed. The client computer does this before compression because a compressed file or data object would almost certainly result in a substantially unique identifier that is different from a substantially unique identifier generated from the file or data object before compression. Alternatively, a client computer could generate a substantially unique identifier for a file or data object after the file or data object is compressed. A compression agent may compare the substantially unique identifiers to identify identical files or data objects, and thus only store one of them.

In some embodiments, the single instancing system determines whether to store an instance of a compressed or uncompressed file (or data object, but file is used in this and the following paragraphs discussing compression for brevity) based on whether the files are compressed using the same compression scheme, whether the compressed files can be decompressed by the single instancing system, and/or other factors. For example, consider the following three situations involving compressed files: 1) where the single instancing system has previously stored an instance of a file that is compressed and a request is made to store another instance of the file that is also compressed; 2) where the single instancing system has previously stored an instance of a file that is uncompressed and a request is made to store another instance of the file that is compressed; and 3) where the single instancing system has previously stored an instance of a file that is compressed and a request is made to store another instance of the file that is uncompressed. Metadata associated with the file is typically not compressed. Moreover, information about the compression scheme (for example, what compression algorithm is used to compress the file) may be provided as metadata to the single instancing system.

For the first situation, if the two file instances are compressed using the same compression scheme (for example, using the same compression algorithm), the single instancing system can avoid storing the second instance of the file. Otherwise, the single instancing system stores the second instance of the file. However, if the second instance of the file is compressed using a different compression scheme, the single instancing system may avoid storing the second instance of the file, if the single instancing system is able to decompress the first instance of the file and recompress the first instance of the file using the different compression scheme. If the single instancing system is not able to do so, the single instancing system stores the second instance of the file. However, this decompress and recompression may be too computationally expensive, depending upon various factors (for example, the time needed to decompress and recompress the file, the algorithm, etc.), and so the single instancing system may simply store the second instance of the file.

For the second situation, if the second instance of the file is compressed using a compression scheme that is known to the single instancing system (for example, using a known compression algorithm), the single instancing system can avoid storing the second instance of the file. This is because, when the provider of the second compressed instance requests the file, the single instancing system can retrieve the first uncompressed instance, compress it using the known compression scheme and provide it to the requester. However, if such compression is too computationally expensive, the single instancing system may simply store the second compressed instance of the file. If the second instance of the file is compressed using a compression scheme that is not known to the single instancing system, the single instancing system stores the second instance of the file. This is because the single instancing system has to be able to provide the second compressed instance of the file to the requestor when requested.

For the third situation, if the first instance of the file is compressed in such a way that it can be decompressed by the single instancing system, the single instancing system can avoid storing the second uncompressed instance of the file. This is because, when the provider of the second uncompressed instance requests the file, the single instancing system can retrieve the first compressed instance, decompress it, and provide it to the requestor. However, if such decompression is too computationally expensive, the single instancing system may simply store the second uncompressed instance of the file. If the first instance of the file is compressed in such that it cannot be decompressed by the single instancing system, the single instancing system stores the second uncompressed instance of the file. This is because the single instancing system has to be able to provide the second uncompressed instance of the file to the requestor.

The single instancing system may be configurable to reduce processing time, transmission bandwidth, etc. with small files. For example, an administrator-configurable value would allow the administrator to configure the single instancing system to ignore files or data objects below a given size. For example, any file or data object below a certain threshold (for example, one kilobyte) may simply be stored, and a substantially unique identifier would not determined for it. Any file or data object greater than the threshold (for example, one kilobyte) would then be single instanced. An administrator may adjust this threshold up or down. As another example, the single instancing system may allow the administrator to configure it to always single instance files or data objects of a certain type or category (for example, executable files or modules may always be single instanced if they rarely change). Alternatively, the single instancing system may allow the administrator to never single instance files or data objects of a certain type or category (for example, log files may never be single instanced, because they typically change quite frequently).

The single instancing system may associate timestamps with the files or data objects or with their generated substantially unique identifiers. A timestamp may indicate the time at which the file or data object was created, last accessed or modified, or the time at which the single instancing system generated the substantially unique identifier for it, or the time at which the file or data object was stored by the single instancing system. The single instancing system may do so to determine whether a file or data object is substantially newer than another file or data object already stored in the single instancing system. For example, the two files or data objects may have the same substantially unique identifier, meaning that they contain the same data. The single instancing system may compare the timestamp of the first, previously stored, file or data object with that of the second file or data object. If the timestamp of the second file or data object is substantially newer than the timestamp of the first file or data object, the single instancing system may nonetheless store the second file or data object, even though it is duplicative of a file or data object that is already stored.

In this context, substantially newer means that the age (as determined by its timestamp) of the second file or data object is less than the age (as determined by its timestamp) of the first, previously stored, file or data object by a certain amount or more (configurable by an administrator). The single instancing system could then prune off older versions as the data ages and is migrated to other storage, such as longer-term storage. For example, a first file or data object could have a timestamp indicating that its age is ten months. A second file or data object could have a timestamp indicating that its age is three months. If the administrator has configured the amount to be six months, then the second file or data object is substantially newer than the first file or data object, because the age of the second file or data object (three months) is less than the age of the first file or data object (then months) by more than the configured amount (six months). Therefore, the single instancing system would store the second file or data object, and the first file or data object could be migrated to longer-term storage, such as to tape.

The single instancing system may be employed in any variety of architectures. For example, it may be employed with heterogeneous storage hardware, and thus is not reliant on a specific hardware platform to perform all of the single instancing functions. Instead, multiple, different data storage platforms may be employed for storing data under the storage policies. Further, the architecture may be tiered or federated wherein one server manages multiple cells (and each of those cells in turn may manage lower tier cells). In some embodiments, the cells may be arranged in hierarchies or organized in configurations such as those described in U.S. patent application Ser. No. 12/060,186, filed Mar. 31, 2008, entitled Systems and Methods of Hierarchical Storage Management, Such as Global Management of Storage Operations, the entirety of which is herein incorporated by reference.

The single instancing system may employ many other functions. For example, it may employ content indexing agents to index the content all data blocks. These content indexes may then be searched to permit users to readily locate desired data objects. Further details regarding content indexing may be found in U.S. patent application Ser. No. 11/694,869, filed Mar. 30, 2007, entitled Method and System for Offline Indexing of Content and Classifying Stored Data, the entirety of which is herein incorporated by reference.

Determining Data Object Similarity

Various methods of determining if one file or data object is similar (e.g., two instances of the same data) to another file or data object will now be described. However, those of ordinary skill in the art will recognize that many other methods besides those described herein may be used to achieve similar results.

In some embodiments, the single instancing system determines if two files or data objects are similar by performing a binary comparison. For example, a first file or data object can be compared byte by byte with a second file or data object, or portions of the first file or data object can be compared with portions of the second file or data object. If each byte of the compared data in each file or data object matches, then the two files or data objects are identical and therefore similar. Otherwise, the two files or data objects do not match and are not treated as similar.

In some embodiments, the single instancing system determines if two files or data objects are similar by creating a digest or fingerprint of the data contained in each file or data object. For example, as storage operations are performed, the single instancing system may perform a cryptographic hash on each file or data object to create a digest of the file or data object. The single instancing system compares the digest of the file or data object with stored digests created for other files or data objects. If the digests of two files or data objects match, then the single instancing system may consider the files or data objects to be identical. The single instancing system can use any suitable hashing algorithm, such as SHA512. For applications that create data files having embedded data objects, the single instancing system identifies the embedded data objects, and determines the similarity of each data object with other data objects found either within the same data file or in other data files or stores managed by the single instancing system.

Figure 4:
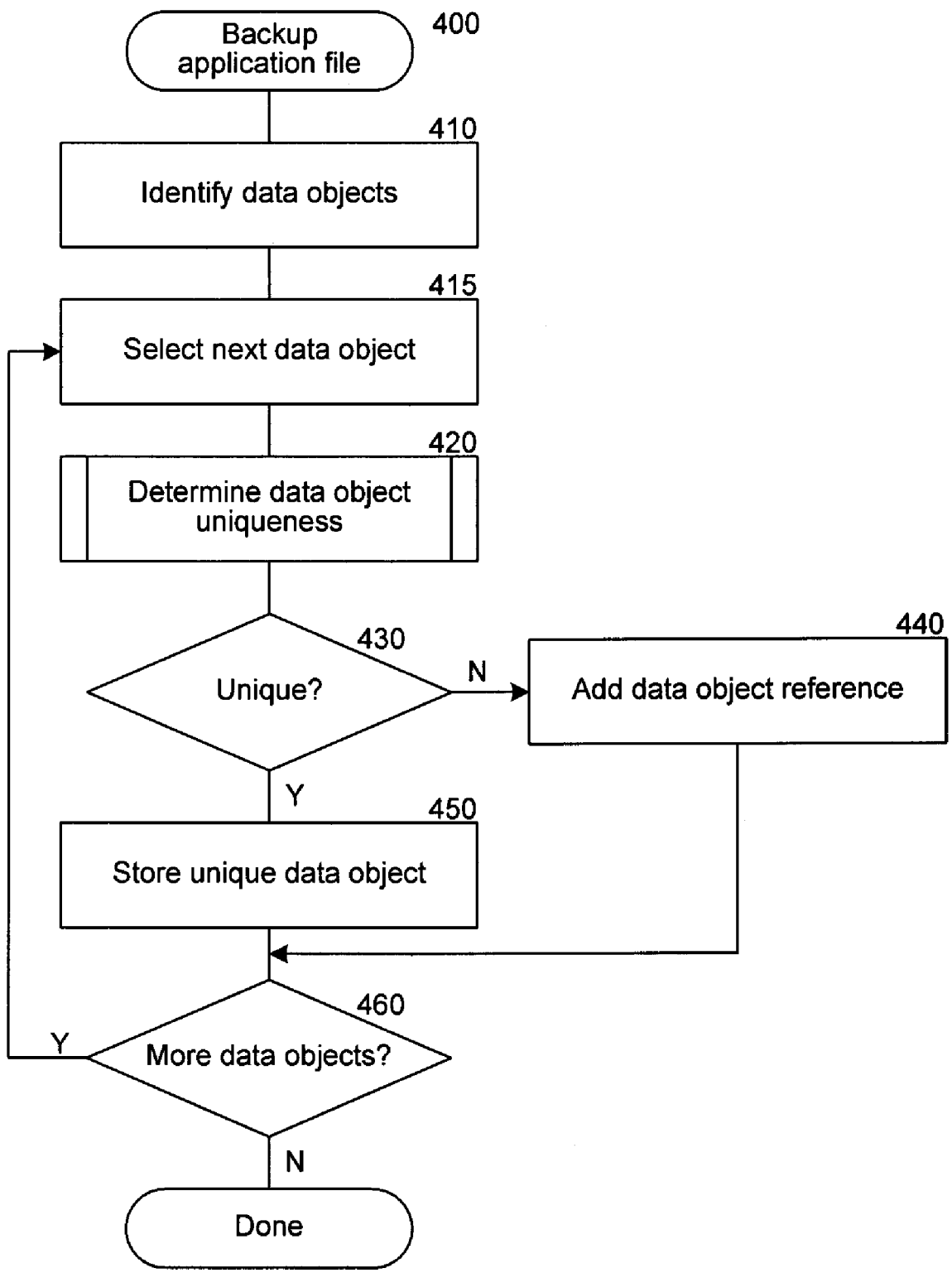
FIG. 4 is a flow diagram that illustrates processing of a storage operation manager component of the single instancing system, in one embodiment.
Figure 5:
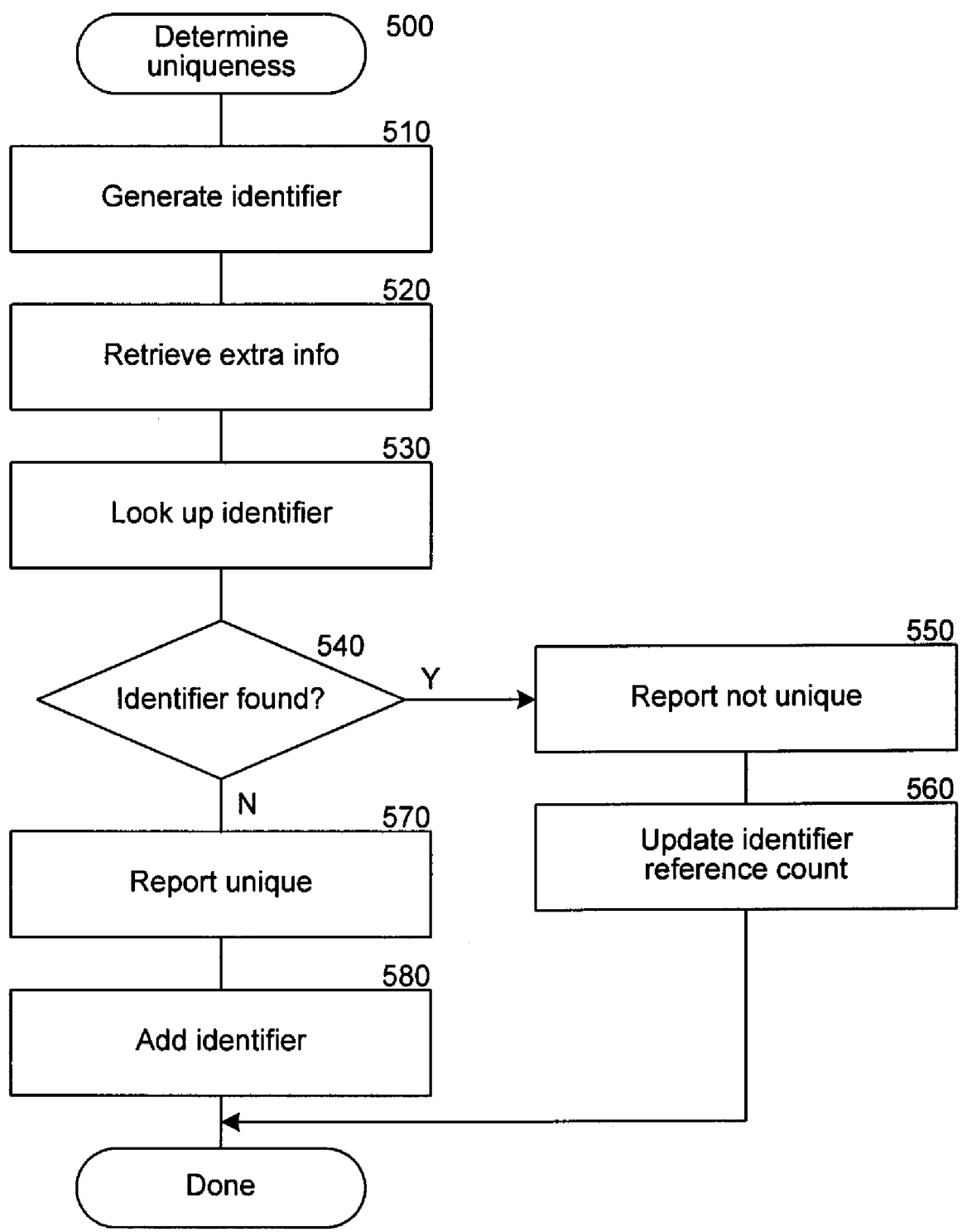
FIG. 5 is a flow diagram that illustrates processing of the single instancing system to determine whether a data object is unique, in one embodiment.
Figure 6:
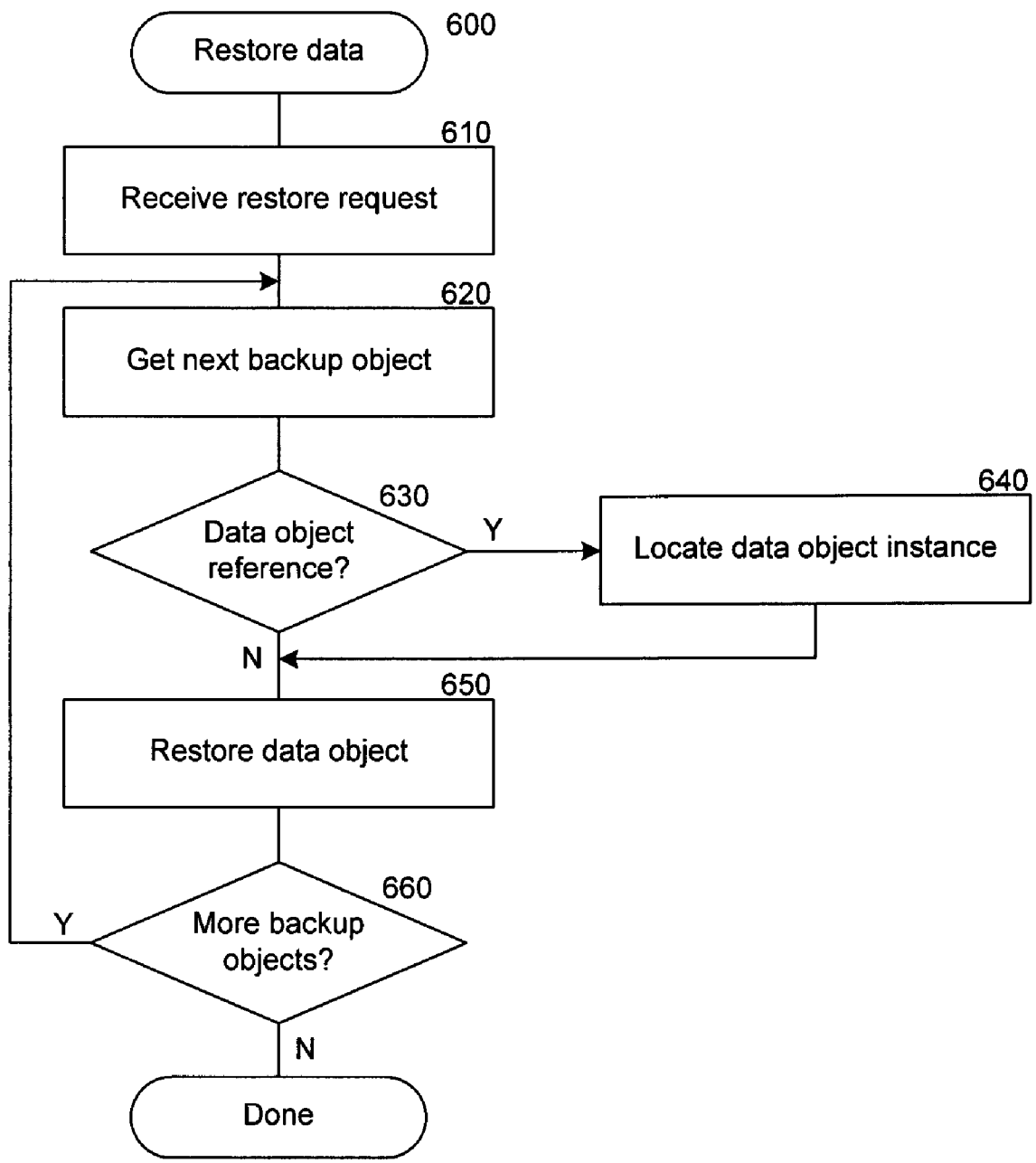
FIG. 6 is a flow diagram that illustrates processing of the storage operation manager component to restore data, in one embodiment.

FIGS. 4-6 are representative flow diagrams that depict processes used in some embodiments. These flow diagrams do not show all functions or exchanges of data, but instead they provide an understanding of commands and data exchanged under the single instancing system. Those skilled in the relevant art will recognize that some functions or exchange of commands and data may be repeated, varied, omitted, or supplemented, and other (less important) aspects not shown may be readily implemented.

FIG. 4 is a flow diagram that illustrates the processing of the storage operation manager component 160 of the single instancing system in one embodiment. The storage operation manager component 160 is invoked when a storage operation that creates a copy of a file is requested. In step 410, the storage operation manager component 160 identifies data objects within the file to be copied, such as by using information about the application that created the file and the format used by the application to store data objects. For example, the application may provide an object model that the storage operation manager component 160 can invoke to enumerate objects within the file, or the storage operation manager component 160 may understand the format used by the application for storing objects in the file. An application author, manufacturer or third party may also provide a module for parsing the application file that the storage operation manager component 160 can invoke. In this way, the application author, manufacturer or third party can provide access to the data objects within the file without exposing the actual format used to third parties.

In step 415, the storage operation manager component 160 selects the first identified data object. In step 420, the storage operation manager component 160 determines whether the data object is unique, or if the storage manager component has previously copied the data object. For example, the storage operation manager component 160 may compute a digest in the manner described herein, and compare the digest to the digests of previously copied data objects to determine if the data object is an instance of a previously copied data object. In decision step 430, if the data object is unique, then the storage operation manager component 160 continues at step 450, else the storage operation manager component 160 continues at step 440. In step 440, the storage operation manager component 160 adds a reference (e.g., to an index of data managed by the single instancing system, such as by incrementing a reference count in the index) to the already backed up instance of the data object, and then continues to step 460. In step 450, the component stores the unique data object. In decision step 460, if the storage operation manager component 160 identified more data objects within the file, then the storage operation manager component 160 loops to step 415 to select the next data object, else the storage operation manager component 160 completes.

FIG. 5 is a flow diagram that illustrates the processing of the single instancing system to determine whether a file or data object is unique, in one embodiment. These steps may be invoked by the storage operation component 160, such as when performing a storage operation as described in FIG. 4 or at other times. In step 510, the identifier generation component 120 generates a substantially unique identifier of the file or data object that is the target of the storage operation. In step 520, the file identification component 110 gathers (for example, by querying the file system of a client) additional information about the file or data object, such as the file or data object's size, security information, or other attributes. In step 530, the identifier comparison component 130 determines if the substantially unique identifier of the file or data object and any supplemental information matches that of any existing file or data object tracked by the single instance database component 140. In decision step 540, if the data objects match, then the single instancing system continues at step 550, otherwise the single instancing system continues at step 570. In step 550, the single instancing system reports to the entity that invoked the storage operation manager component 160 that the file or data object is not unique. In step 560, the single instancing system updates the substantially unique identifier reference count tracked by the single instance database component 140 and then concludes. In step 570, the single instancing system reports to the entity that invoked the storage operation manager component 160 that the file or data object is unique. In step 580, the single instancing system adds the file or data object's substantially unique identifier and other information to the list of files and data objects tracked by the single instance database component 140. These steps then conclude.

FIG. 6 is a flow diagram that illustrates the processing of the storage operation manager component 160 to restore data, in one embodiment. The single instancing system invokes the storage operation manager component 160 when it receives a request, for example, to restore data. In step 610, the storage operation manager component 160 receives a request to restore data. In step 620, the storage operation manager component 160 selects the next file or data object referred to by the request. For example, the request may identify 10 files or data objects, and the storage operation manager component 160 selects the first file or data object on which to perform the following steps. In decision step 630, if the selected file or data object is a reference to an instance of a file or data object stored somewhere else, then the storage operation manager component 160 continues at step 640, else the storage operation manager component 160 continues at step 650. In step 640, the storage operation manager component 160 locates the referenced instance of the file or data object and continues to step 655. In step 655, the storage operation manager component 160 restores the file or data object from the referenced instance of the file or data object. In step 650, the storage operation manager component 160 restores the file or data object directly from the file or data object. In decision step 660, if there are more files or data objects referred to by the received request, then the storage operation manager component 160 loops to block 620 to select the next file or data object on which to perform these steps, else the storage operation manager component 160 completes.

Single Instance Continuous Data Replication

Where multiple computing systems containing data that is to be single instanced are located remotely from a single instancing database, various system configurations may be employed to avoid transferring data that is common to the remote multiple computing systems to the single instancing database. Three example configurations are described herein. Under a first configuration, a single instancing database is maintained at a first location and at each remote location (e.g., a second location, a third location, etc.). De-duplicated information in the single instancing database at each remote location is transferred to the single instancing database at the first location. Under a second configuration, a single instancing database is maintained at a first location, and a computing system at each remote location (e.g., a second location, a third location, etc.) sends queries to the single instancing database at the first location to identify what data to transfer to the single instancing database. Under a third configuration, each computing system at each remote location (e.g., a second location, a third location, etc.) queries a single instancing database at a first location before transferring any data to the single instancing database. Each of these configurations is discussed separately below. In the discussed configurations, the example of a central or home office with one or more remote or satellite offices is used, where each remote office includes one or more computing systems. Although the terminology used to discuss these configurations implies a certain geographical positioning of computing systems, the single instancing system described herein may be used in a wide variety of configurations and is not limited to a specific geographical positioning. Furthermore, the single instancing system described herein is not limited to the hub-and-spoke model implied by the terminology used to discuss these configurations. For example, a multi-tier hierarchical configuration could be employed, in which computing systems at the leaf nodes transfer data to computing systems at their respective parent nodes, which transfer data to computing systems at their parent nodes, and so on, up to the computing system at the top-most node of the hierarchy. As another example, a mesh configuration could be employed, in which a first computing system in the mesh configuration transfers data to a second computing system, the data to be ultimately transferred to a third computing system.

CDR, also called continuous data protection or continuous backup, refers to copying computer data by automatically saving a copy of every change made to that data, essentially capturing every version of the data that the user saves. It allows an administrator (or other user) to restore data to any point in time. There are multiple methods known in the art for capturing the continuous changes involving different technologies that serve different needs. CDR-based solutions can provide fine granularities of restorable objects ranging from disk images to logical data objects such as files, email data files, email messages, and database files and logs.

CDR differs from traditional backup or copy operation in that an administrator (or other user) does not have to specify the point in time to which the administrator would like to recover until the administrator is ready to perform a restore. Traditional backups or copy operations can only restore data to the point at which the backup or copy was made. With CDR, there are typically no backup or copy schedules. When data is written to disk, it can also be synchronously or asynchronously written to a second location, usually another computer over the network. In some situations, CDR will require less space on secondary storage media (usually disk) than traditional backup or copy operations. Most CDR solutions save byte- or block-level differences rather than file-level differences. This means that if one byte of a 100 GB file is changed, only the changed byte or block is backed up or copied. In contrast, traditional incremental and differential backups and copy operations generally make copies of entire files when those files change.

Figure 7:
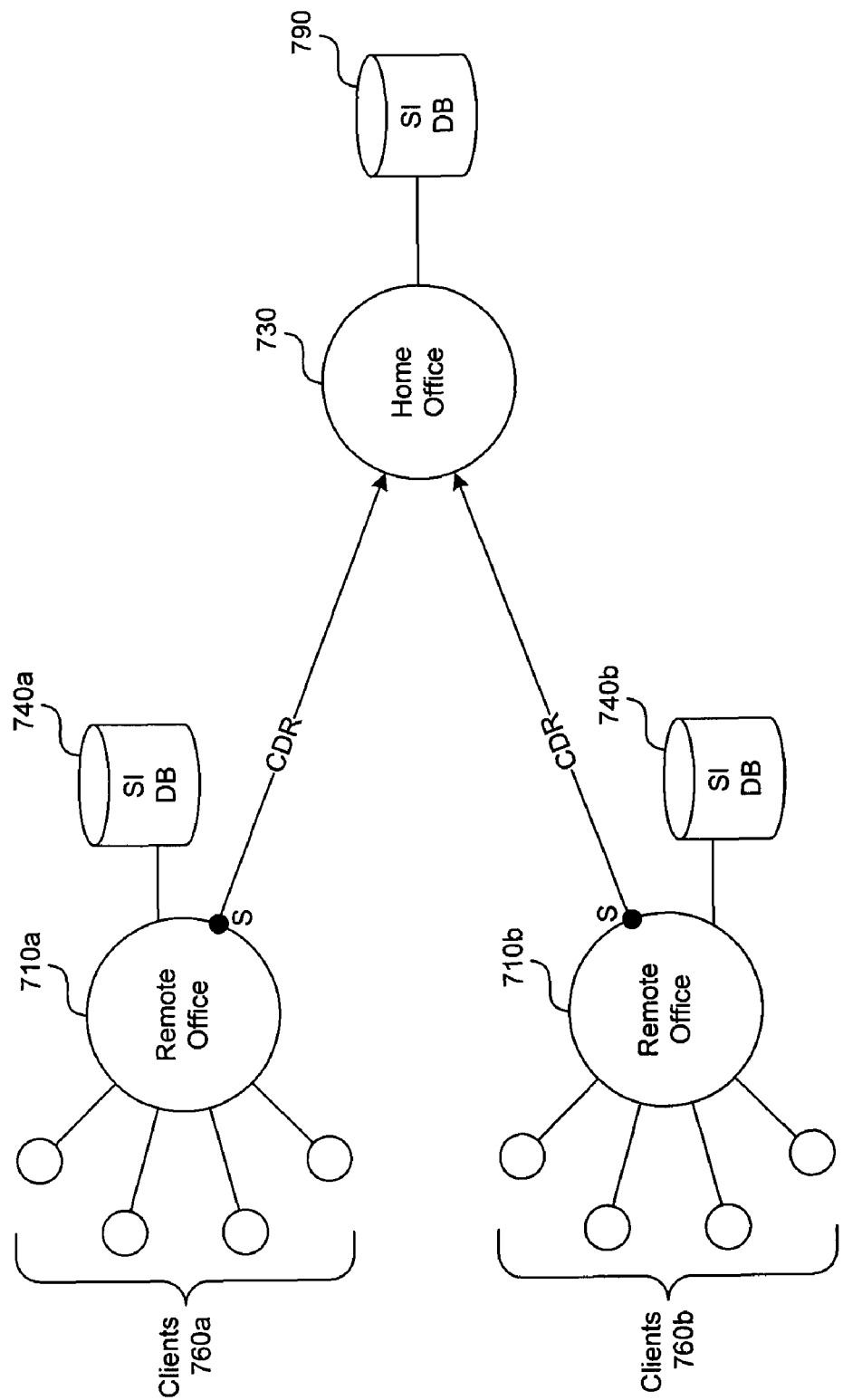
FIG. 7 is a block diagram that illustrates an environment in which the single instancing system may be configured to operate.

FIG. 7 illustrates an environment according to the first example configuration. In the environment of FIG. 7, two remote offices 710*a* and 710*b* are connected to a home office 730. Although FIG. 7 depicts two remote offices 710, only a single remote office, or more than two remote offices, may be connected to the home office 730. Each remote office includes its own single instance database 740. For example, remote office 710*a* includes single instance database 740*a* and remote office 720 includes single instance database 740*b*. Multiple client computing systems 760*a* and 760*b* at each remote office 710 provide data to the single instance database 740 at their respective locations. Clients 760*a* are part of remote office 710*a*, and store data in single instance database 740*a*. Clients 760*b* are part of remote office 710*b*, and store data in single instance database 740*b*. The clients 760 may be connected to their respective remote office 710 by way of a local area network (wired or wireless), with the remote offices 710 being connected to the home office 730 by a wide area network, or other network such as a public computer network (e.g., the Internet). By employing known CDR techniques, data from each remote single instance database 740 is sent to the home office 730 to be stored in a central data store (not shown in FIG. 7) at the home office 730. Accordingly, data is copied from clients 760 to a local single instance database 740, and then data blocks unique to that remote office 710 are provided using CDR to create a copy at the home office 730.

Each remote office 710 tracks incremental changes for its clients 760, and then employs CDR to transmit those incremental changes to the home office 730. The home office 730 may then in turn employ its own single instance database 790 to avoid any duplication between the remote offices 710. For example, clients 760 that run Microsoft Windows typically will each have a similar C:\Windows directory containing operating system files. Multiple client computing systems 760 will have stored a single copy of the C:\Windows directory at the remote single instance database 740, which will then be replicated to the central data store at the home office 730. The home office 730 will in turn store a single copy of the C:\Windows directory in the single instance database 790.

Figure 8:
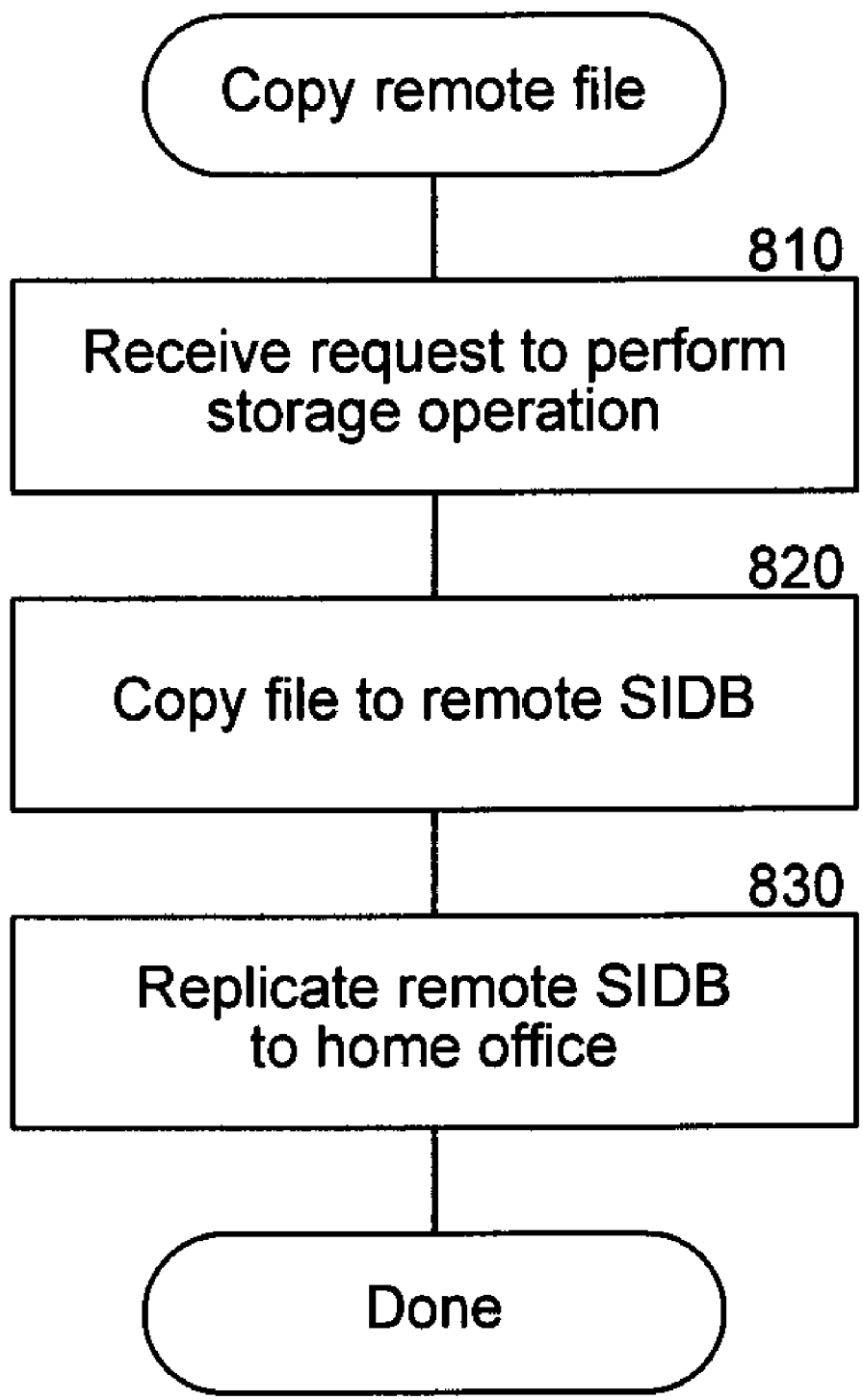
FIG. 8 is a flow diagram that illustrates copying a remote file or data object in the environment of FIG. 7

FIG. 8 is a flow diagram that illustrates copying a remote file or data object in the environment of FIG. 7. In step 810, the single instancing system receives a request to perform a storage operation. For example, the request may be a routinely scheduled request to backup or copy the contents of a client computing system 760. For each file or data object involved in the request, the single instancing system performs the following steps. In step 820, the single instancing system copies the file or data object from the client computing system 760 to a single instance database 740 located at the remote office 710. The single instance database 740 ensures that only one copy of each file or data object is stored. For example, the single instance database 740 may create or have created a substantially unique identifier for each stored file or data object and create or have created a substantially unique identifier for each new file or data object to be stored. The single instance database 740 may then compare the substantially unique identifier of the new file or data object with that of each previously stored file or data object to determine whether the new file or data object is already stored. In some embodiments, the single instance database 740 may store metadata that is specific to some clients while only storing one instance of the file or data object itself.

Accordingly, the client 760 copies data to a computing system that is geographically close, and then later the data from each client 760 can be copied to the home office 730 by copying the single instance or unique data from the single instance database 740 at the remote office 710. In this context, computing systems that are geographically close refers to computing systems that may be in the same room, in the same building or on the same campus. Computing systems that are geographically remote refers to computing systems that are not geographically close. In step 830, the single instancing system replicates the contents of the remote single instance database 740 to the home office 730. This step can occur using CDR or other traditional methods of copying data. After step 830, these steps conclude. Using this method, each remote single instance database 740 may send identical files or data objects to the home office single instance database 790 (i.e., data that is unique as to each individual remote office 710, but duplicative as to both remote offices 710). However, only one instance of each file or data object at the remote office 710 is stored by the home office single instance database 790.

Figure 9:
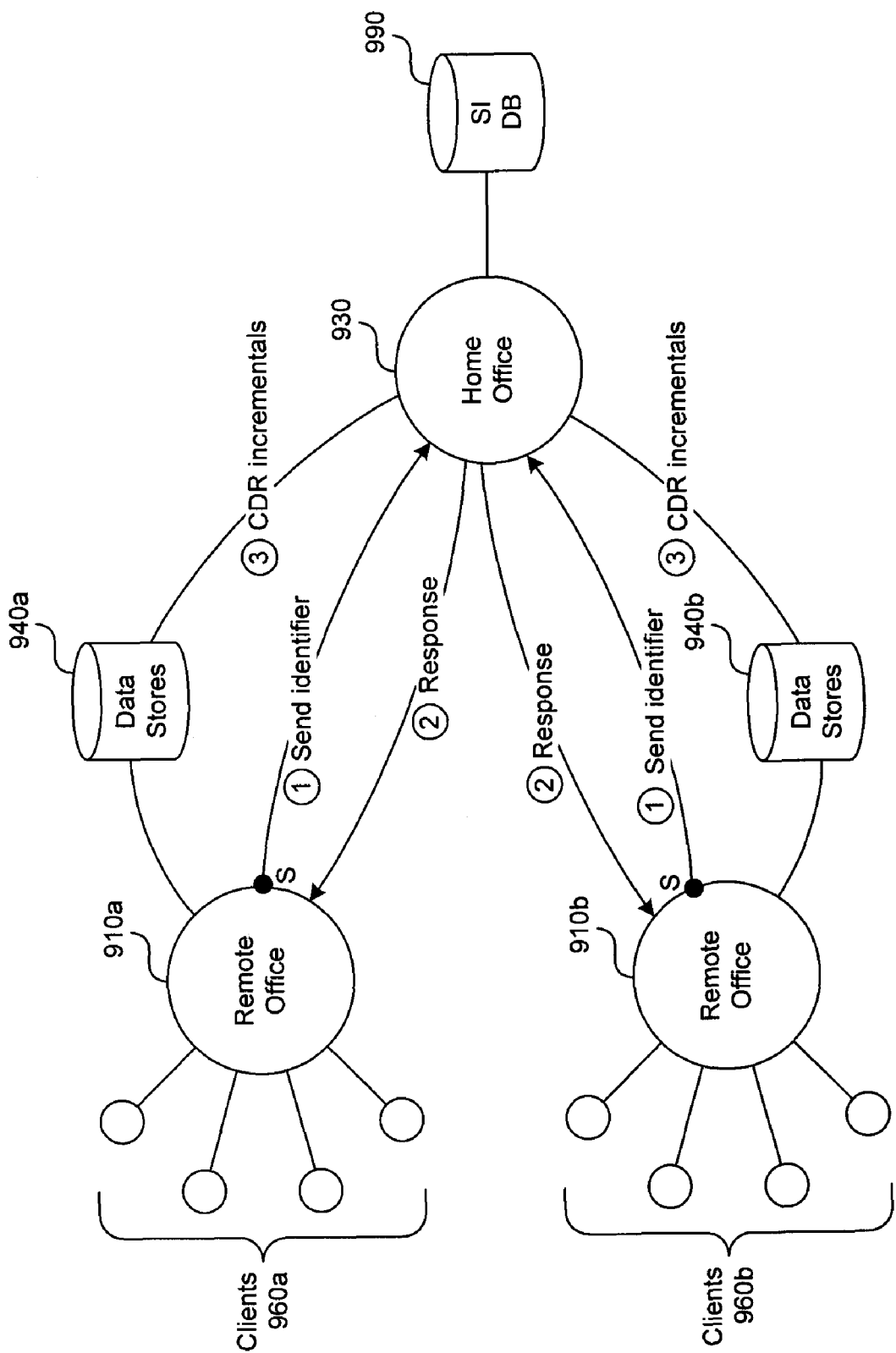
FIG. 9 is a block diagram that illustrates another environment in which the single instancing system may be configured to operate.

FIG. 9 illustrates an environment according to the second example configuration. In the environment of FIG. 9, two remote offices 910*a* and 910*b* are connected to a single home office 930. Although FIG. 9 depicts two remote offices 910, only a single remote office, or more than two remote offices, may be connected to the home office 930. Remote office 910 includes multiple client computing systems 960*a* and a data store 940*a*. Remote office 910*b* includes multiple client computing systems 960*b* and a data store 940*b*. The home office 930 maintains a single instance database 990. The remote office 910 generates a substantially unique identifier for each file or data object that is to be potentially stored. For example, the remote office 910 may include a computing system (not shown in FIG. 9) that generates the substantially unique identifier for each file or data object that is to be potentially stored on behalf of clients 960. The remote office 910 then transmits the substantially unique identifier to the home office 930. The home office 930 checks the single instancing database 990 to determine whether the transmitted substantially unique identifier matches any existing substantially unique identifier in the single instance database 990 in order to determine whether the file or data object that is to be potentially stored is redundant. The home office 930 then sends a response back to the remote office 910 that indicates whether the file or data object that is to be potentially stored is unique. The remote office 910 stores the unique files or data objects locally in a data store 940. The remote office 910 then employs CDR to incrementally transfer new changes or updates to the home office 930.

The single instancing system may employ various optimization techniques. For example, the remote office 910 may cache substantially unique identifiers and only transmit one instance of a substantially unique identifier to the home office 930 if it detects more than one instance of the same substantially unique identifier. After the single instancing system has made a request to the single instance database 990 to determine if a particular file or data object is unique, the remote office 910 may cache the response so that subsequent identical files or data objects do not generate a new request to the single instance database 990. Rather, the single instancing system consults the cache first to determine if a previous request determined whether the file or data object is unique. If the cache responds that the file or data object is not unique, then the remote office 910 does not need to query the single instance database 990 to determine if the file or data object is unique.

Figure 10:
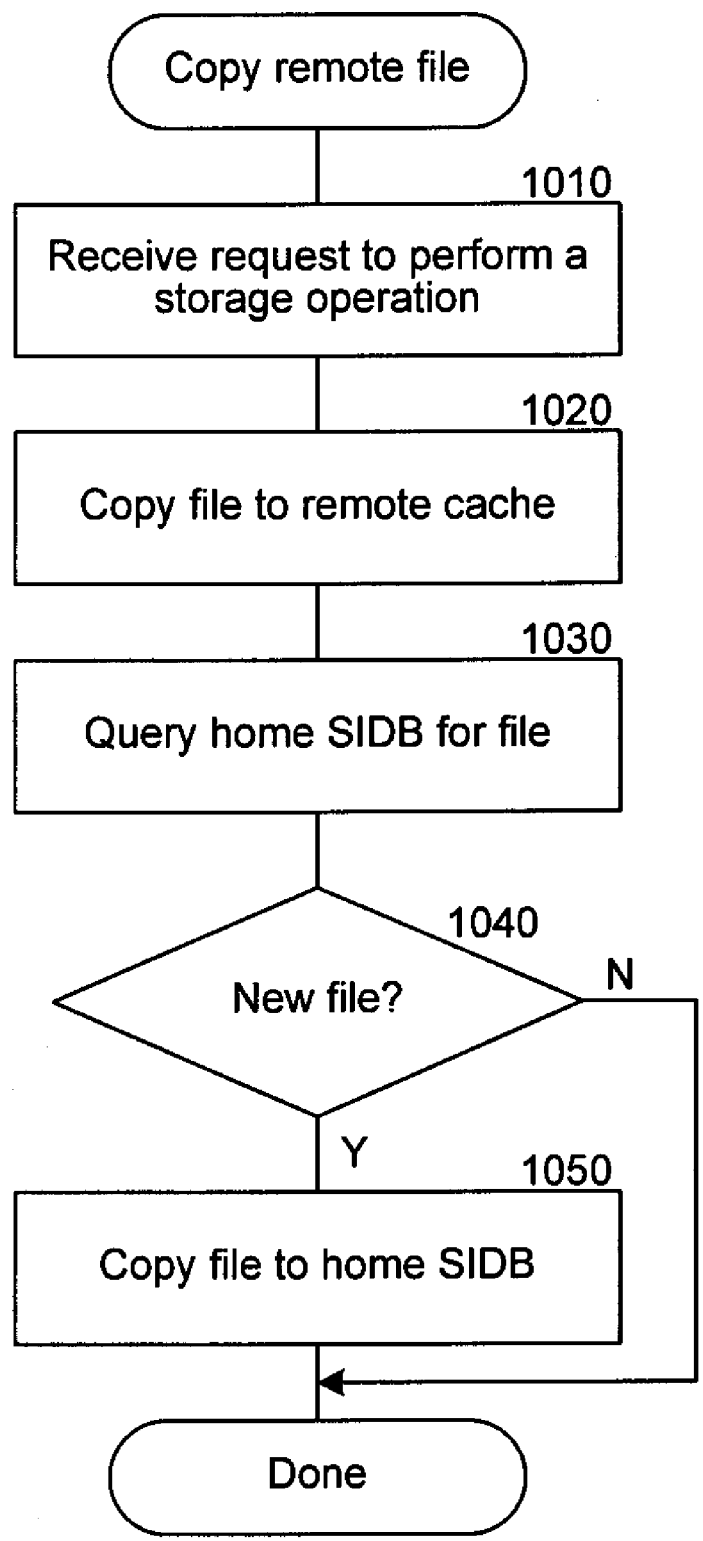
FIG. 10 is a flow diagram that illustrates copying a remote file or data object in the environment of FIG. 9.

FIG. 10 is a flow diagram that illustrates copying a remote file or data object in the environment of FIG. 9. In step 1010, the single instancing system receives a request to perform a storage operation. For each file or other data object involved in the request, the single instancing system performs the following steps. In step 1020, the single instancing system copies the file or data object to a data management server (not shown in FIG. 9) that caches files or data objects at the remote office 910. Thus, the client copies data to a computing system that is geographically close. The data management server in this method may contain duplicate files or data objects from many clients 960. According to this method the data management server does not do single instancing of its own. In step 1030, the single instancing system queries the single instance database 990 at the home office 930 to determine whether the single instance database 990 already has a copy of the file or data object. In decision step 1040, if the file or data object is new to the single instance database 990, then the single instancing system continues at step 1050, else these steps conclude. In step 1050, the single instancing system copies the new file or data object to the single instance database 990. If there are duplicates of the file or data object, then later when the single instance database 990 is queried for the duplicate files or data objects, the single instance database 990 will indicate that the file or data object is not new and need not be copied. In this way, duplicate data is not sent to the home office 930. After step 1050, these steps conclude. This method differs from the method of FIG. 8 in that duplicate data may be stored at the remote office 910, but duplicate data is not sent to the home office 930. In general, in comparison with the method of FIG. 8, the method of FIG. 10 will send more queries to the home office 930, but less data.

Figure 11:
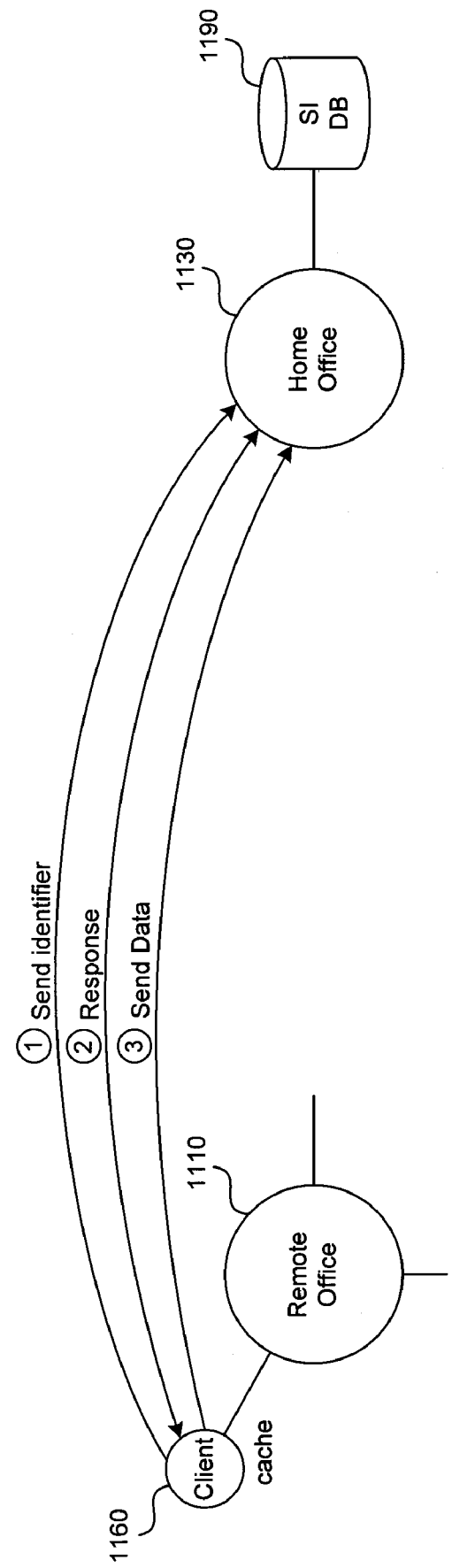
FIG. 11 is a block diagram that illustrates another environment in which the single instancing system may be configured to operate.

FIG. 11 illustrates an environment according to the third example configuration. In the environment of FIG. 11, each remote client 1160 (as opposed to each remote office 1110) transmits a query with a substantially unique identifier to the home office 1130. Each client 1160 may have generated the substantially unique identifier itself, or another computing system may generate them on behalf of the clients 1160. The single instance database 1190 determines whether the substantially unique identifier is already stored (i.e., indicating that the corresponding file or data object has previously been stored) and transmits a response to the client 1160. If the response indicates that the file or data object is new, then the client 1160 sends that file or data object to the home office 1130. The single instancing system typically does not employ CDR, and each remote office 1110 typically does not include a local data store used by its clients 1160. The single instancing system may employ caching for optimization at each client 1160. The home office 1130 also uses a single instance database 1190 to store only a single instance of each file or data object.

Figure 12:
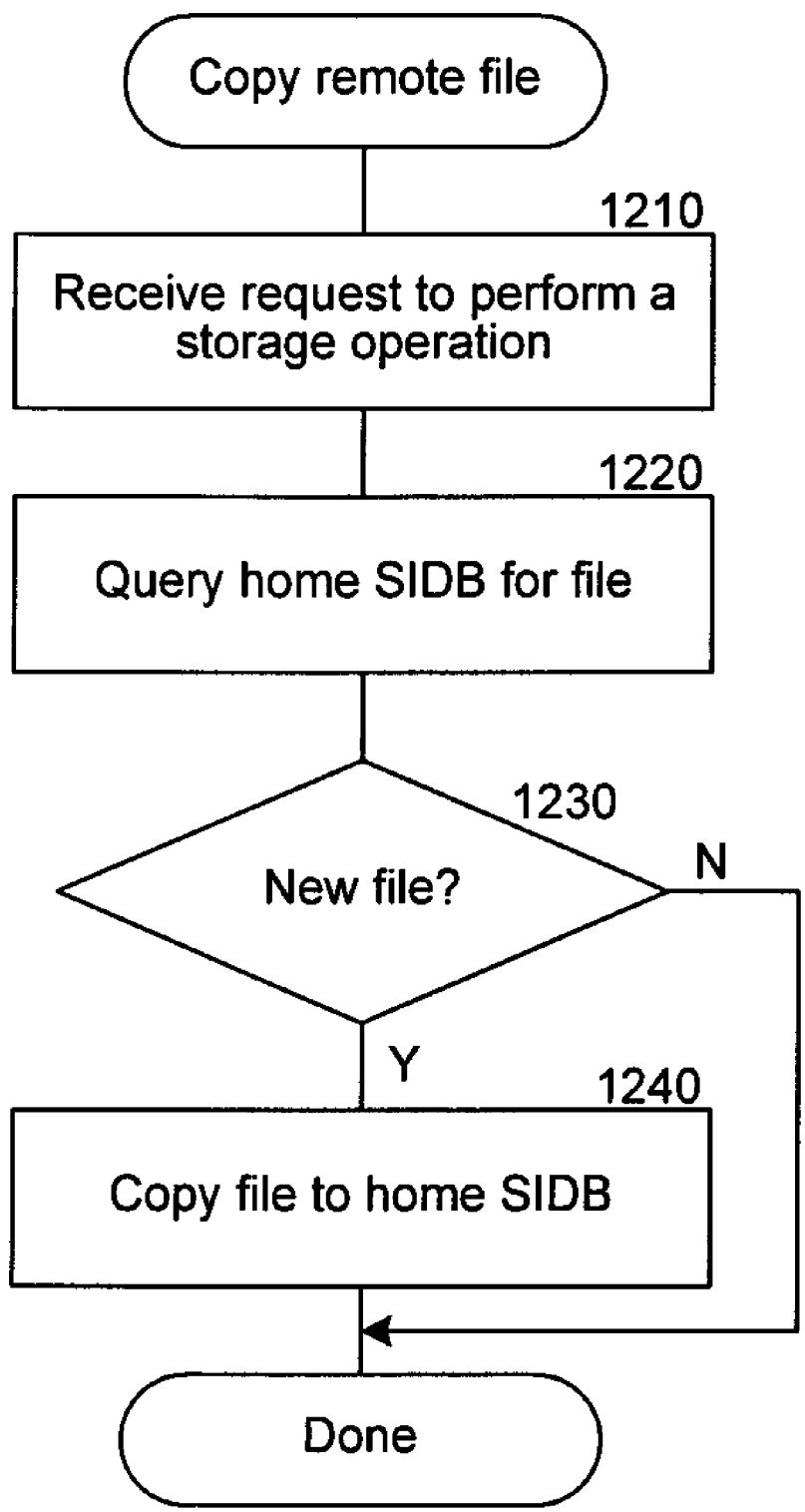
FIG. 12 is a flow diagram that illustrates copying a remote file or data object in the environment of FIG. 11.

FIG. 12 is a flow diagram that illustrates copying a remote file or data object in the environment of FIG. 11. In step 1210, the single instancing system receives a request to perform a storage operation. For each file or other data object involved in the request, the single instancing system performs the following steps. In step 1220, the single instancing system queries the single instance database 1190 at the home office 1130 to determine whether the single instance database 1190 already has a copy of the file or data object. In decision step 1230, if the file or data object is new to the single instance database 1190, then the single instancing system continues at step 1240, else these steps conclude. In step 1240, the single instancing system copies the new file or data object directly from the client 1160 to the single instance database 1190. In this way, duplicate data is not sent to the home office 1130. After step 1240, these steps conclude. This method differs from the method of FIG. 10 in that the remote office 110 does not employ a remote file cache. Therefore, the method of FIG. 12 results in the sending of additional queries from the clients 1160 to the home office 1130 because each client 1160 will query the single instance database 1190.

As shown in FIGS. 7-12, the single instancing system does not always maintain a single instance database in the same location. Various benefits are derived by maintaining a single instance database in various locations. For example, a single instance database may be maintained in a production environment (for example, geographically close to production servers) so as to reduce the amount of time needed to single instance data or to reduce the amount of data to be transmitted between computing systems. The data stored in the single instance database may then be replicated to another single instance database or secondary storage.

Conclusion

From the foregoing, it will be appreciated that specific embodiments of the storage system have been described herein for purposes of illustration, but that various modifications may be made without deviating from the spirit and scope of the invention. For example, although backup operations have been described, the single instancing system may be used to reduce many types of redundant storage operations. As one example, the storage system may be employed by an Internet proxy server to reduce downloading of redundant files over the Internet by tracking a digest of each downloaded file and the location of a downloaded instance of the file behind the proxy server such that subsequent requests for the file can be serviced from the previously downloaded instance without accessing the file over the Internet. Similarly, the storage system could be used by a file system to reduce storage space by storing a single copy of data placed in multiple locations throughout the file system. Accordingly, the invention is not limited except as by the appended claims.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

These and other changes can be made to the invention in light of the above Detailed Description. While the above description details certain embodiments of the invention and describes the best mode contemplated, no matter how detailed the above appears in text, the invention can be practiced in many ways. Details of the system may vary considerably in implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

I claim:

1. A method of storing application-specific data objects included within a file in a data storage system, the method comprising:

receiving a request to store data contained in a file generated by an application,
  wherein the data includes multiple discrete application-specific data objects having differing sizes;
determining the application that generated the file that includes the multiple discrete application-specific data objects;
based on the determination of the application, identifying at least some of the multiple discrete application-specific data objects within the data,
  wherein the identifying includes parsing the file using an already existing module particular to the application that generated the file, and
  wherein the module does not expose the format of the file; and
for at least a first one of the identified multiple discrete application-specific data objects:
  generating a substantially unique identifier that represents the first discrete application-specific data object;
  based on the generated substantially unique identifier, determining whether an instance of the first discrete application-specific data object is already stored in a data storage system; and
  if an instance of the first discrete application-specific data object is not already stored in the data storage system, then storing the first discrete application-specific data object in the data storage system.

2. The method of claim 1 wherein the file is a data file created by an electronic mail server application, and the multiple discrete application-specific data objects are electronic mail messages included within the data file.

3. The method of claim 1 wherein generating a substantially unique identifier includes using a cryptographic hash function to generate a hash of the first discrete application-specific data object, and wherein determining whether an instance of the first discrete application-specific data object is already stored in a data storage system includes comparing the generated hash to another hash stored by the data storage system.

4. The method of claim 1 wherein generating a substantially unique identifier includes applying a cryptographic hash algorithm to only the portion of the file corresponding to the first discrete application-specific data object to generate a hash value of the first discrete application-specific data object.

5. The method of claim 1, further comprising:
  if an instance of the first discrete application-specific data object is already stored in the data storage system, incrementing a reference count corresponding to the first discrete application-specific data object.

6. The method of claim 1, further comprising:
  if an instance of the first discrete application-specific data object is already stored in the data storage system:
    identifying metadata associated with the first discrete application-specific data object; and
    storing the identified metadata.

7. The method of claim 1, further comprising:
  for the first discrete application-specific data object:
    determining a first timestamp of the first discrete application-specific data object;
    determining a second timestamp of an instance of the first discrete application-specific data object already stored in the data storage system;
    comparing the first and second timestamps; and
    if the first timestamp exceeds the second timestamp by a threshold amount, then storing the first discrete application-specific data object in the data storage system.

8. The method of claim 7, further comprising if the first timestamp exceeds the second timestamp by a threshold amount, then removing the instance of the first discrete application-specific data object from the data storage system.

9. The method of claim 1, wherein the first discrete application-specific data object is encrypted, and wherein the method further comprises:
  determining an encryption scheme of the encrypted first discrete application-specific data object;
  determining an encryption scheme of an encrypted instance of the first discrete application-specific data object already stored in the data storage system;
  comparing the two encryption schemes; and
  if the two encryption schemes are identical, then storing the encrypted first discrete application-specific data object in the data storage system.

10. A system for managing application-generated data objects, the system comprising:
  a processor;
  a storage operation manager component, coupled to the processor, configured to receive a request to perform a storage operation on a logical data container, wherein the logical data container includes data objects generated by one or more applications;
  a data object identification component configured to identify the application-generated data objects included within the logical data container;
  an application data extraction component configured to extract the identified application-generated data objects from the logical data container;
  an identifier generation component configured to generate substantially unique identifiers for the extracted application-generated data objects;
  an index configured to store substantially unique identifiers;
  an identifier comparison component configured to determine whether the generated substantially unique identifiers are already stored in the index; and
  a single instance data store configured to communicate with the identifier comparison component and store a subset of the extracted application-generated data objects, the subset including the extracted application-generated data objects whose substantially unique identifiers were not determined to be stored in the index, wherein only a single instance of an extracted application-generated data object is stored in the single instance data store; and
  wherein the data object identification component is further configured to determine the application that created the logical data container; and
  wherein the data object identification component is further configured to utilize the results of the determination made by the data object identification component to invoke an already existing module to parse the logical data container in order to identify the application-generated data objects included within the logical data container,
    wherein the module is particular to the application that created the logical data container and
    wherein the module is configured to avoid exposing the format of the logical data container.

11. The system of claim 10:
  wherein the storage operation manager component is further configured to receive a request to perform a storage operation on a first logical data container and a second, different, logical data container, wherein the first and second logical data containers each include an instance of an identical data object generated by an application, and wherein the first and second logical data containers are files or databases;
  wherein the identifier generation component is further configured to generate an identical substantially unique identifier for the instances of the identical data object; and
  wherein the single instance data store is further configured to store only a single instance of the identical data object.

12. The system of claim 10 wherein the storage operation manager is further configured to receive requests to continuously replicate data from one or more client computer systems to a data storage system.

13. The system of claim 10 wherein the application data extraction component is further configured to invoke the already-existing module particular to the application to parse the logical data container in order to extract the application-generated data objects from the logical data container.

14. The system of claim 10 wherein:
  the application data extraction component is further configured to extract metadata associated with the application-generated data objects; and
  the single instance data store is further configured to store the extracted metadata.

15. A non-transitory computer-readable storage medium whose contents cause a computer system to perform operation of storing application-specific data objects, the operation comprising:
  receiving a first file that was created by a first application in a first format, wherein the first file contains multiple data objects;
  receiving a second file that was created by a second, different application in a second format,
  wherein the second file contains multiple data objects, and w
  herein the second format differs from the first format;
  determining the application that created the first file and based on that determination, selecting an object model that is particular to the first application;
  determining the application that created the second file and based on that determination, selecting an already created module that is particular to the second application;
  utilizing the object model that is particular to the first application to identify the data objects within the first file;
  utilizing the already created module that is particular to the second application to parse the second file in order to identify the data objects within the second file,
  wherein the already created module differs from the object model, and
  wherein the module avoids exposing the second format of the second file;
  generating substantially unique identifiers for the identified data objects within the first and second files;
  determining whether the identified data objects in the first and second files are already stored in a single instance data store;
  for each of the identified data objects in the first and second files that are already stored in the single instance data store, adding a reference in an index to the already stored data object;
  utilizing the object model that is particular to the first application to extract the identified data objects in the first file that are not already stored in the single instance data store from the first file;
  utilizing the already created object model that is particular to the second application module to extract the identified data objects in the second file that are not already stored in the single instance data store from the second file; and
  storing the extracted data objects in the single instance data store.

16. The non-transitory computer-readable storage medium of claim 15 wherein:
  the first and second files each include an instance of an identical data object;
  generating substantially unique identifiers for the instances of the identical data object includes generating an identical substantially unique identifier for the instances of the identical data object; and
  storing the extracted data objects in the single instance data store includes storing a single instance of the identical data object in the single instance data store.

17. The non-transitory computer-readable storage medium of claim 15 wherein the first and second files are first and second database files, and wherein:
  identifying the data objects includes identifying entries within tables within the first and second database files
  generating substantially unique identifiers includes generating substantially unique identifiers for the data within the entries;
  determining whether the data objects in the first and second files are already stored includes determining whether the data within the entries is already stored in the single instance data store;
  extracting the data objects includes extracting the data within the entries from the first and second database files that is not already stored in the single instance data store; and
  storing the extracted data objects includes storing the extracted data in the single instance data store.

18. The non-transitory computer-readable storage medium of claim 15 wherein determining whether the data objects in the first and second files are already stored includes generating a digest of each data object and comparing the generated digest with one or more previously stored digests.

19. The non-transitory computer-readable storage medium of claim 15 wherein the operation further comprises:
  extracting metadata from the extracted data objects; and
  storing the extracted metadata in the single instance data store.

20. The non-transitory computer-readable storage medium of claim 15 wherein the operation further comprises:
  receiving an indication of a size threshold, wherein data objects whose size does not exceed the size threshold are to be stored in the single instance data store;
  determining the sizes of the data objects within the first and second files; and
  comparing the sizes of the data objects with the size threshold,
  wherein determining whether the data objects in the first and second files are already stored in a single instance data store includes determining that the data objects within the first and second files whose size does not exceed the size threshold are not already stored in a single instance data store, thereby causing such data objects to be stored in the single instance data store.

21. The non-transitory computer-readable storage medium of claim 15 wherein the operation further comprises:
  receiving an indication of a category or type, wherein data objects of the indicated category or type are not to be stored in the single instance data store;

determining the categories or types of the data objects within the first and second files; and comparing the categories or types of the data objects with the indicated category or type, wherein determining whether the data objects in the first and second files are already stored in a single instance data store includes determining that the data objects within the first and second files of the indicated category or type are already stored in a single instance data store.

22. The non-transitory computer-readable storage medium of claim 15 wherein the object model enumerates data objects within the first file.

23. The non-transitory computer-readable storage medium of claim 15 wherein the object model or a storage operation manager component understands a format used by the first application for the first file.

* * * * *

UNITED STATES PATENT AND TRADEMARK OFFICE
CERTIFICATE OF CORRECTION

| | |
|---|---|
| PATENT NO. | : 8,219,524 B2 |
| APPLICATION NO. | : 12/145342 |
| DATED | : July 10, 2012 |
| INVENTOR(S) | : Parag Gokhale |

It is certified that error appears in the above-identified patent and that said Letters Patent is hereby corrected as shown below:

In column 2, line 62, after "FIG. 7" insert -- . --.

In column 9, line 2, delete "requester." and insert -- requestor. --, therefor.

In column 10, line 22, delete "requester." and insert -- requestor. --, therefor.

In column 11, line 41, delete "requester." and insert -- requestor. --, therefor.

In column 22, line 5, in claim 9, delete "1 ," and insert -- 1, --, therefor.

In column 23, line 26, in claim 15, after "perform" insert -- an --.

In column 23, line 35, in claim 15, after "and" delete "w".

In column 23, line 36, in claim 15, delete "herein" and insert -- wherein --, therefor.

In column 23, line 21, in claim 17, delete "files" and insert -- files; --, therefor.

Signed and Sealed this
Sixth Day of November, 2012

David J. Kappos
*Director of the United States Patent and Trademark Office*